(12) United States Patent
Inoue

(10) Patent No.: US 10,868,928 B2
(45) Date of Patent: *Dec. 15, 2020

(54) SWITCH OPERATION ERRONEOUS-DETECTION AVOIDANCE DEVICE AND MULTIFUNCTIONAL MACHINE, AND SWITCH OPERATION ERRONEOUS-DETECTION AVOIDANCE METHOD

(71) Applicant: SHARP KABUSHIKI KAISHA, Sakai (JP)

(72) Inventor: Yasuhiro Inoue, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,945

(22) Filed: Sep. 18, 2019

(65) Prior Publication Data

US 2020/0036843 A1 Jan. 30, 2020

Related U.S. Application Data

(62) Division of application No. 16/161,794, filed on Oct. 16, 2018, now Pat. No. 10,469,678.

(30) Foreign Application Priority Data

Oct. 16, 2017 (JP) ................. 2017-200363

(51) Int. Cl.
*G06F 15/00* (2006.01)
*G06F 3/12* (2006.01)
(Continued)

(52) U.S. Cl.
CPC ..... *H04N 1/00397* (2013.01); *H04N 1/00384* (2013.01); *H04W 4/80* (2018.02); *H04N 2201/0094* (2013.01)

(58) Field of Classification Search
CPC .......... H04N 1/00397; H04N 1/00384; H04N 2201/0094
(Continued)

(56) References Cited

U.S. PATENT DOCUMENTS

| 2014/0022193 A1* | 1/2014 | Kim ...................... G06F 3/0488 345/173 |
| 2014/0071085 A1* | 3/2014 | Kasamatsu ........... G06F 3/0443 345/174 |
| 2014/0253949 A1* | 9/2014 | Tsujimoto ............ H04N 1/0084 358/1.14 |

FOREIGN PATENT DOCUMENTS

JP 2016-074164 A 5/2016

OTHER PUBLICATIONS

Office Action dated Feb. 15, 2019 for U.S. Appl. No. 16/161,794.
Notice of Allowance dated Jul. 3, 2019 for U.S. Appl. No. 16/161,794.

* cited by examiner

*Primary Examiner* — Douglas Q Tran
(74) *Attorney, Agent, or Firm* — ScienBiziP, P.C.

(57) ABSTRACT

A switch operation erroneous-detection avoidance device includes: an execution control unit that if a prescribed device executes a prescribed process with a portable object when an operation switch transits from a pressed state to an unpressed state, prohibits execution of a process associated with the operation switch and if the prescribed device does not execute the prescribed process with the portable object when the operation switch transits from the pressed state to the unpressed state, permits the execution of the process associated with the operation switch.

7 Claims, 26 Drawing Sheets

(51) Int. Cl.
*G06K 1/00* (2006.01)
*H04N 1/00* (2006.01)
*H04W 4/80* (2018.01)

(58) Field of Classification Search
USPC .............................. 358/1.15, 1.13, 1.14, 1.1
See application file for complete search history.

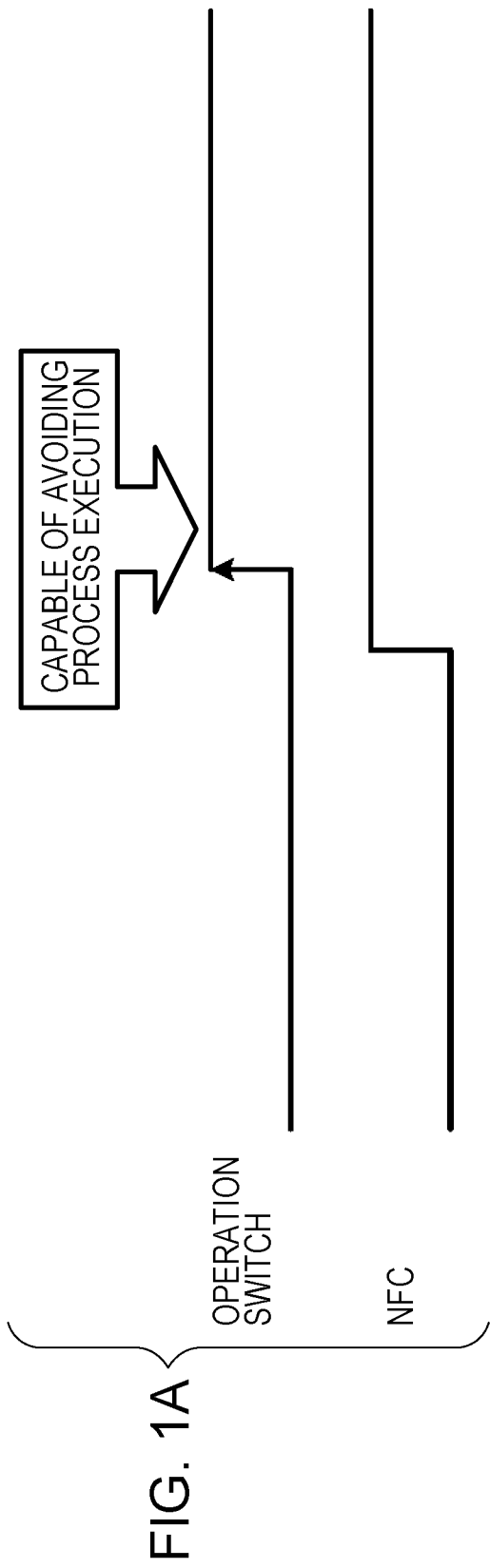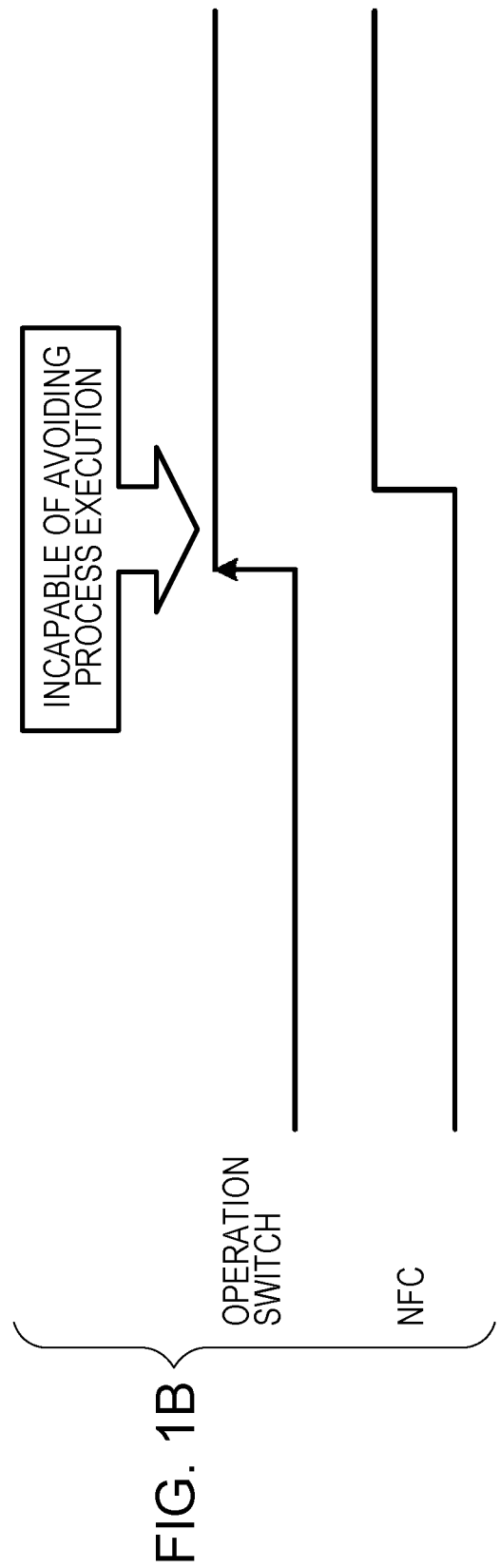

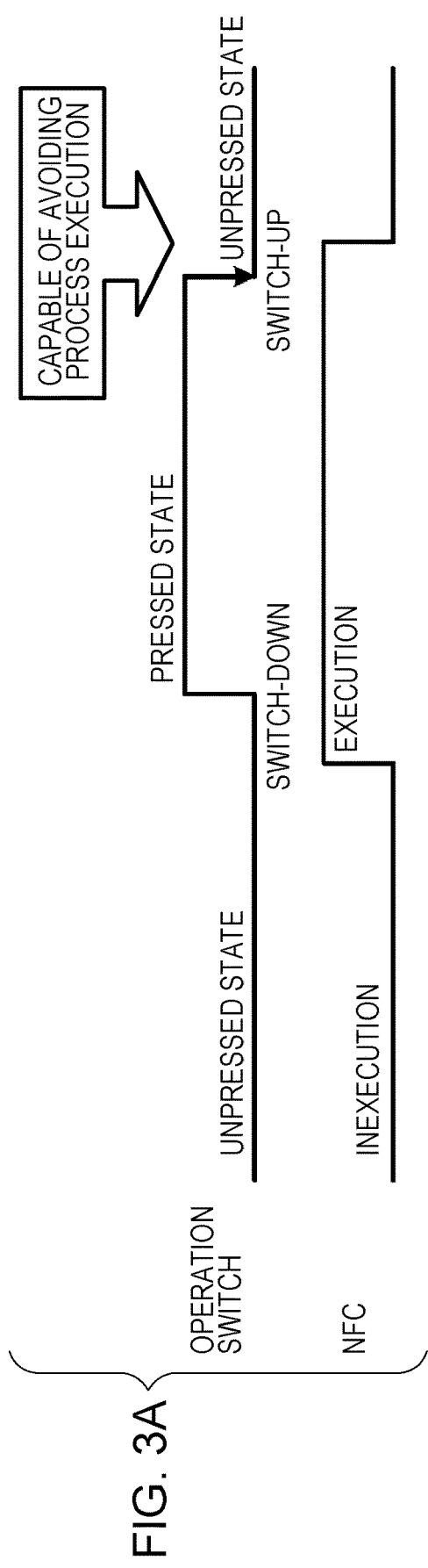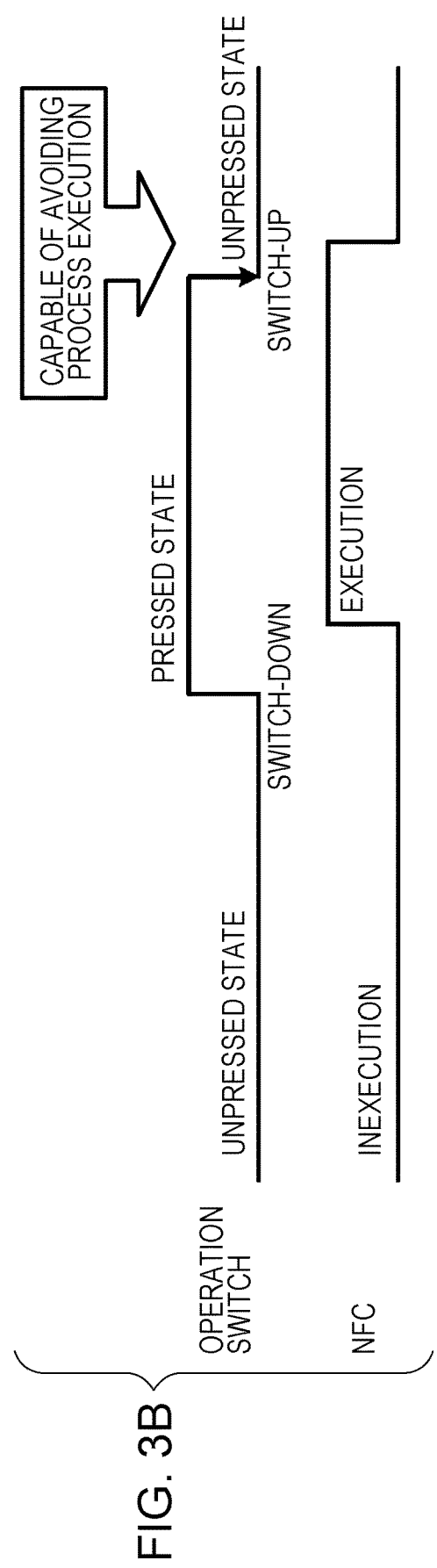

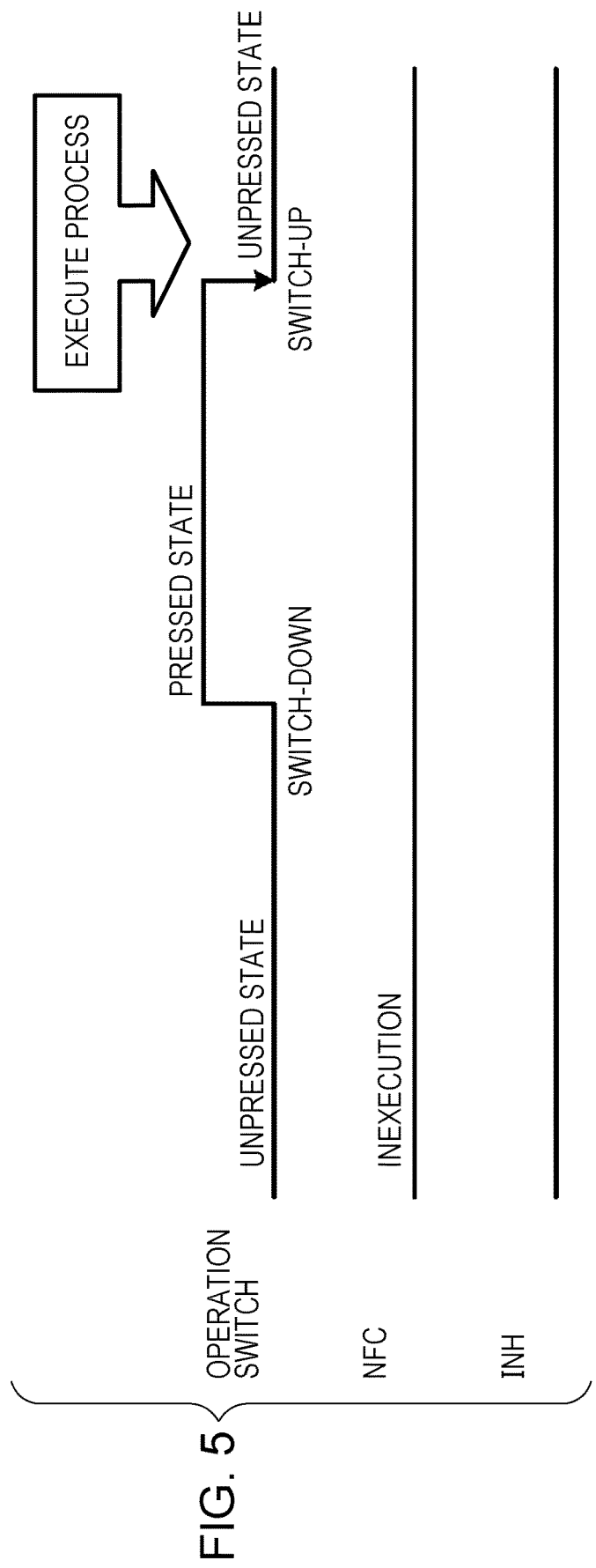

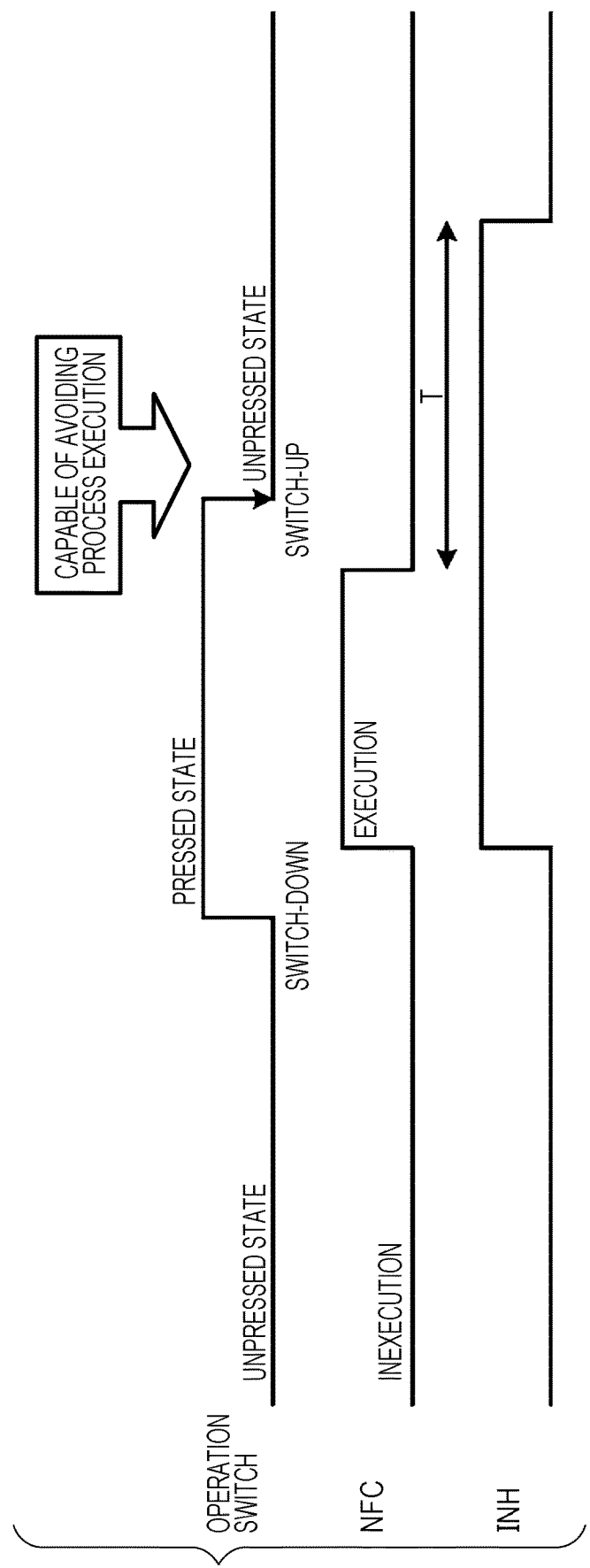

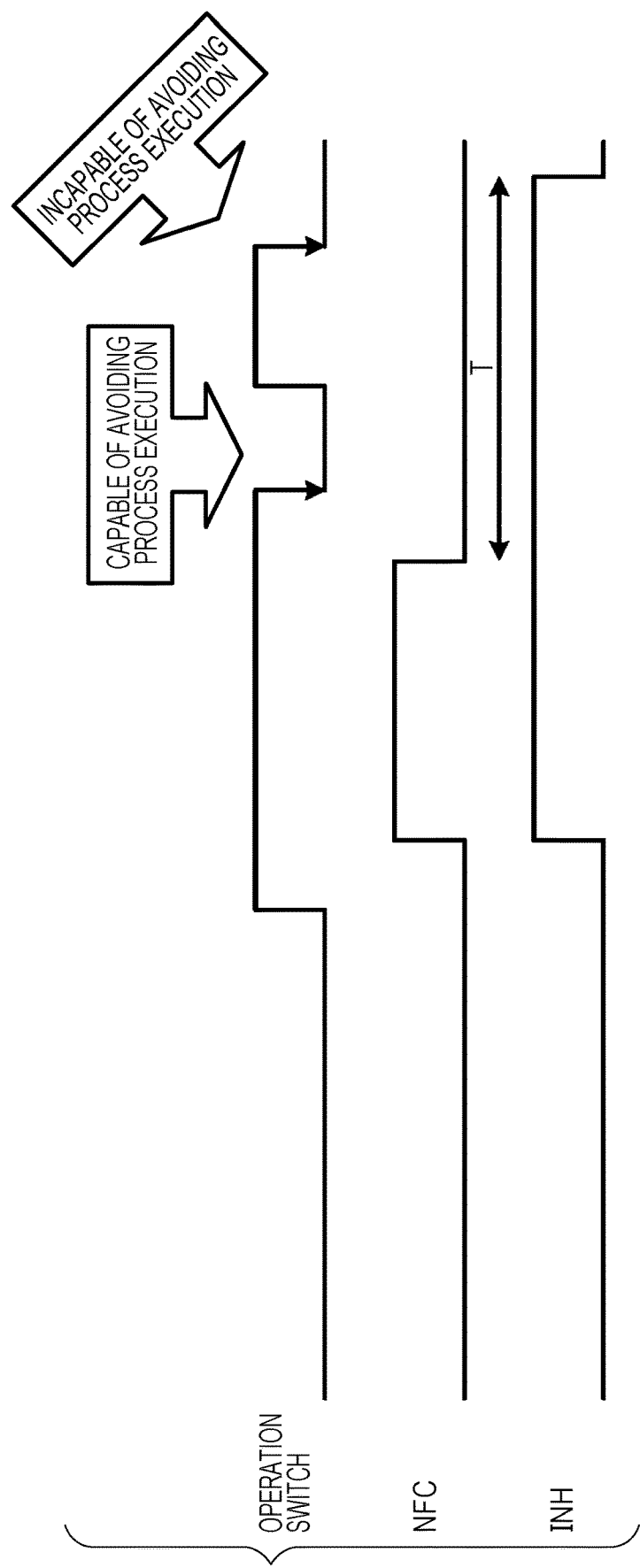

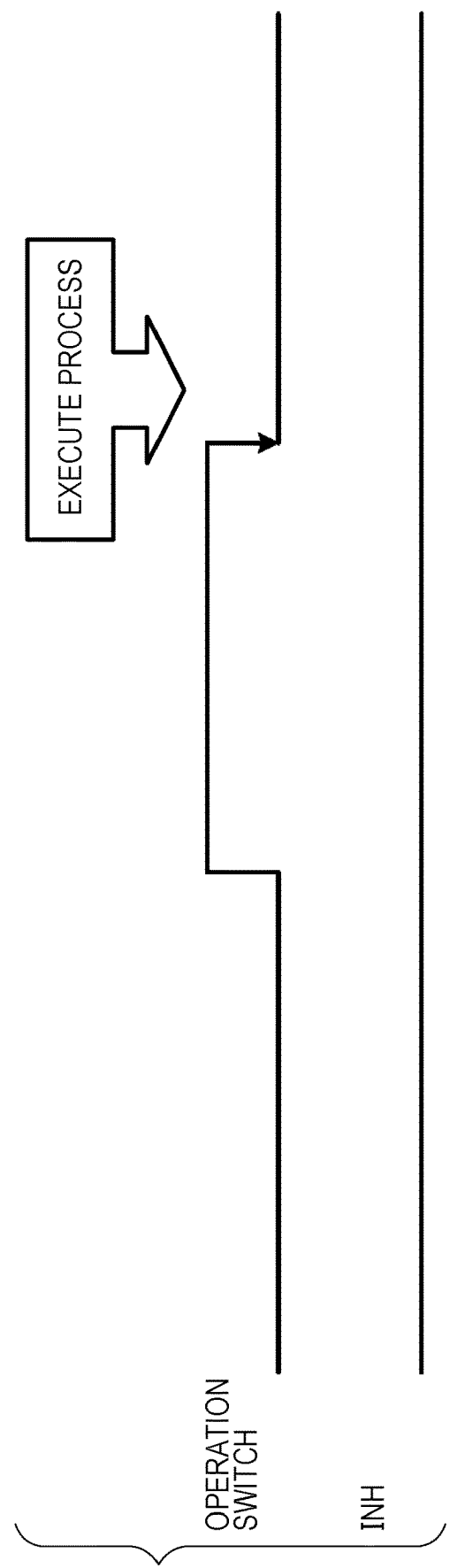

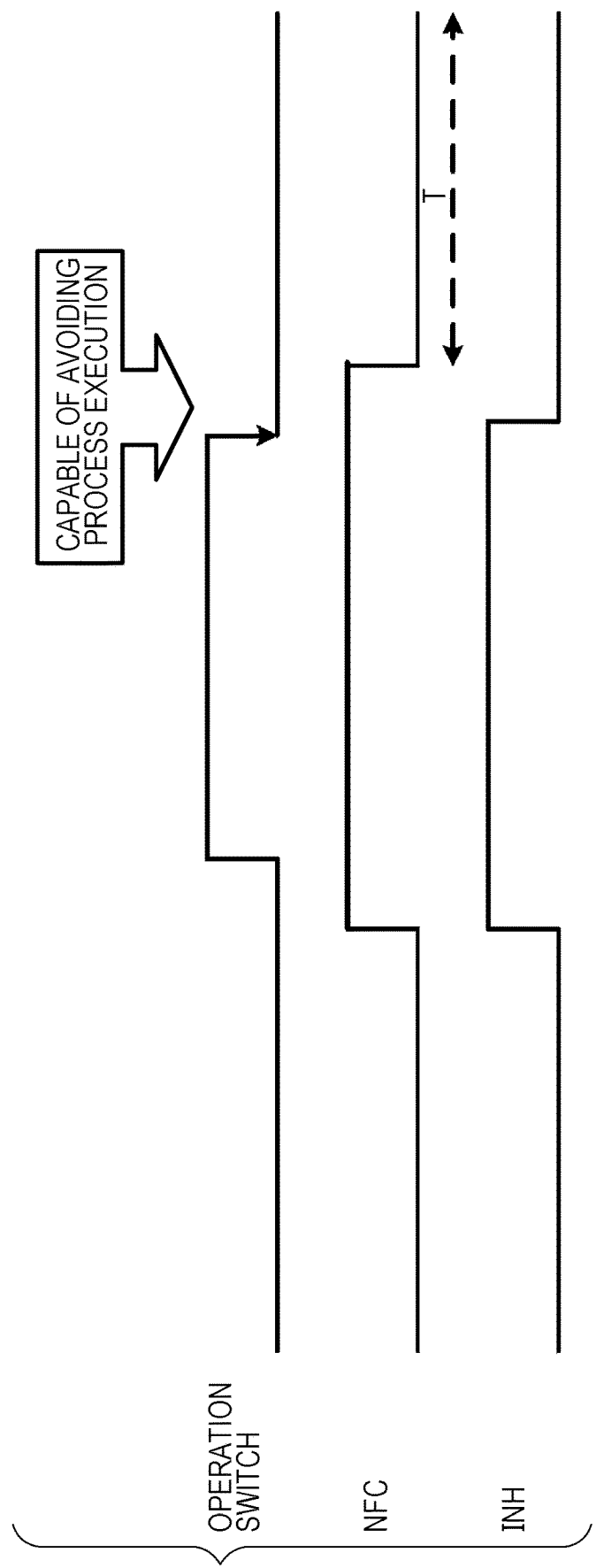

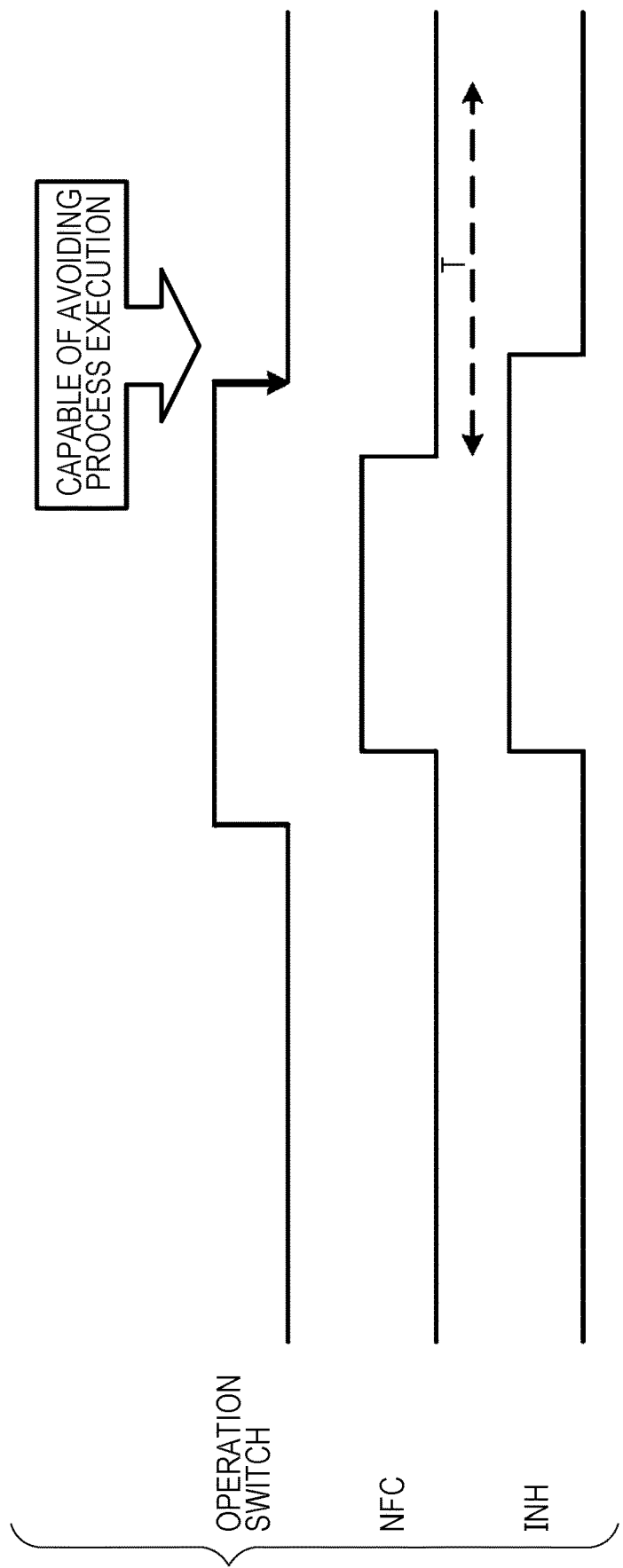

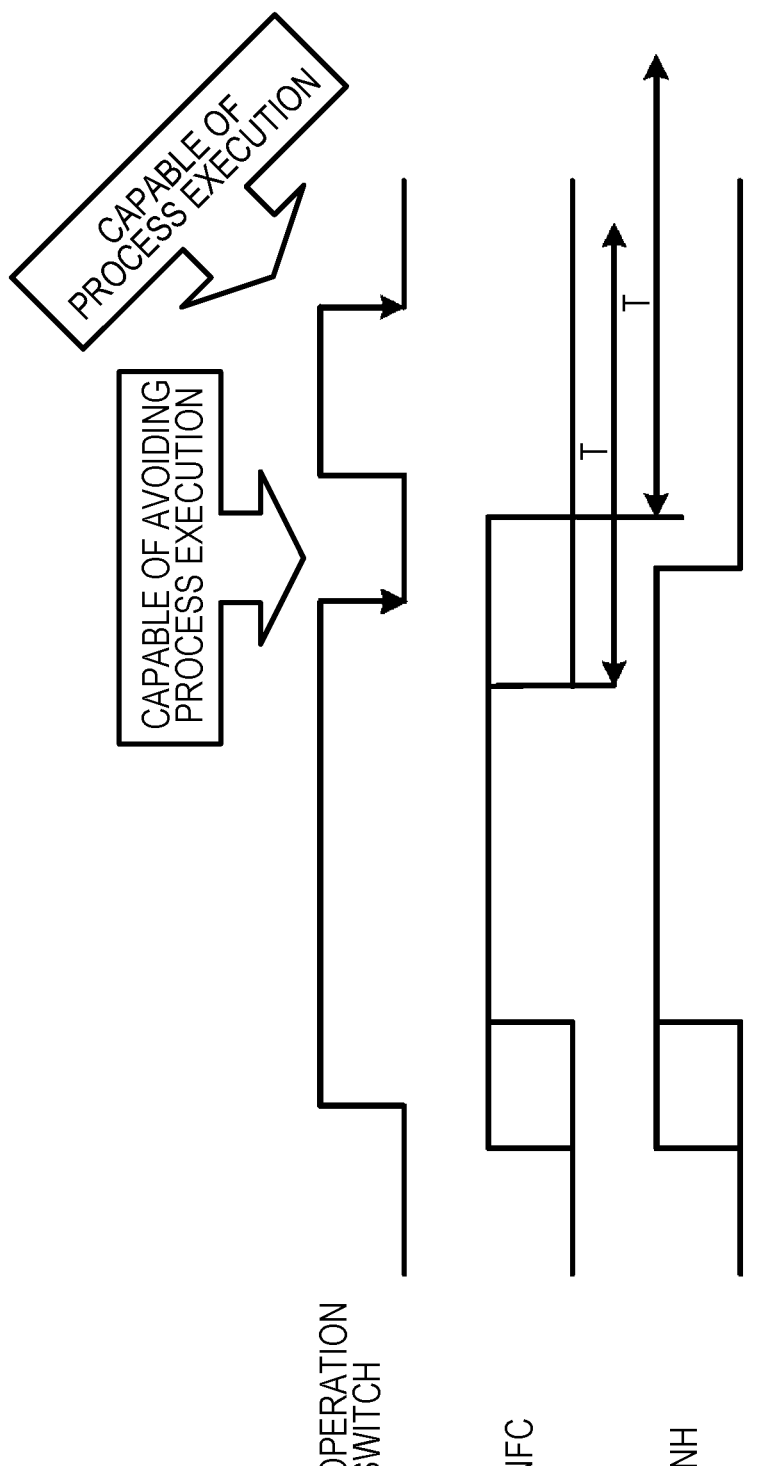

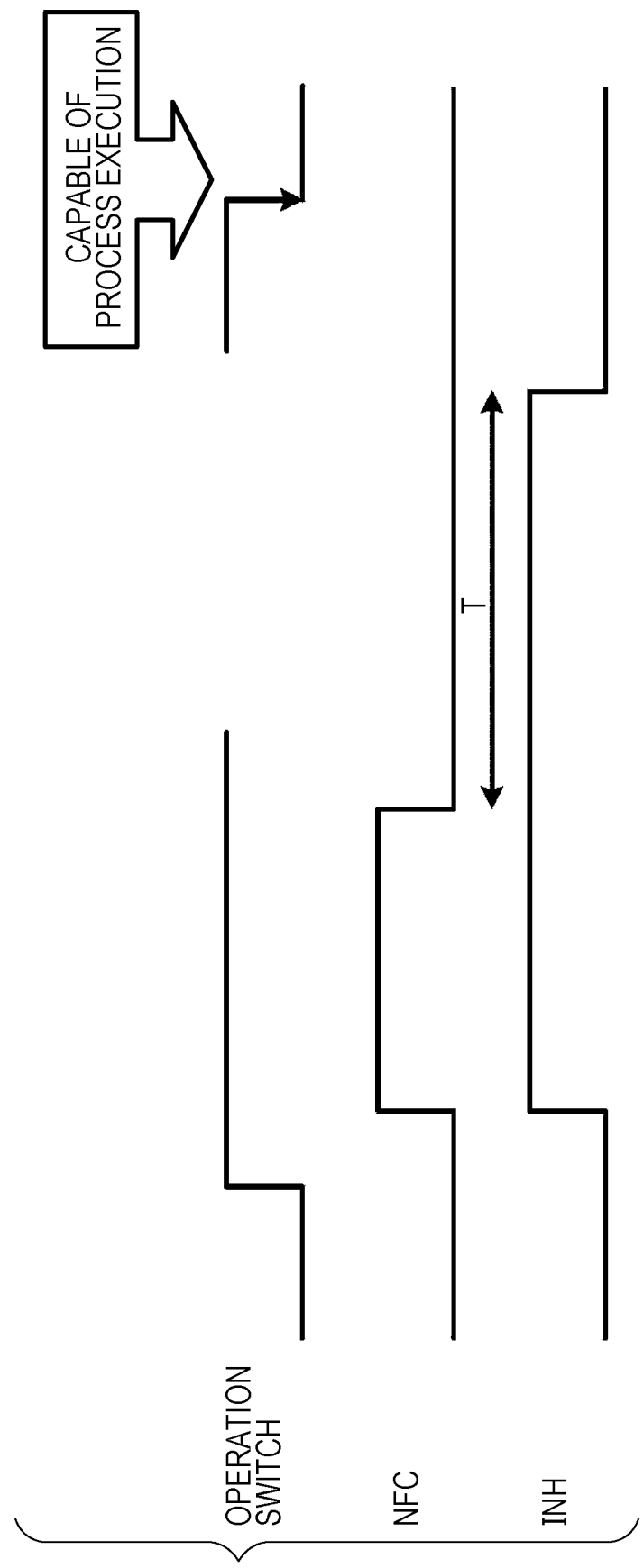

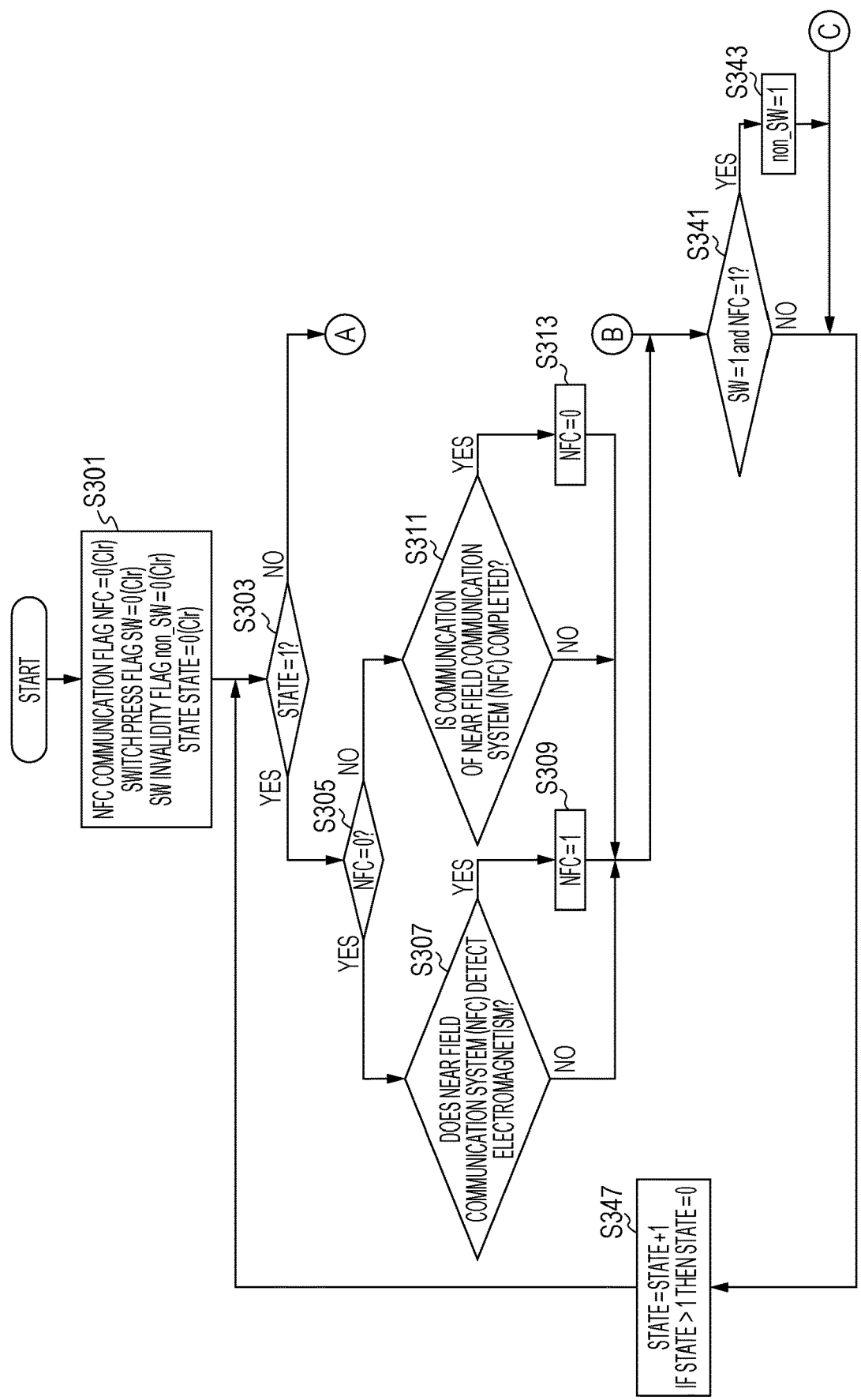

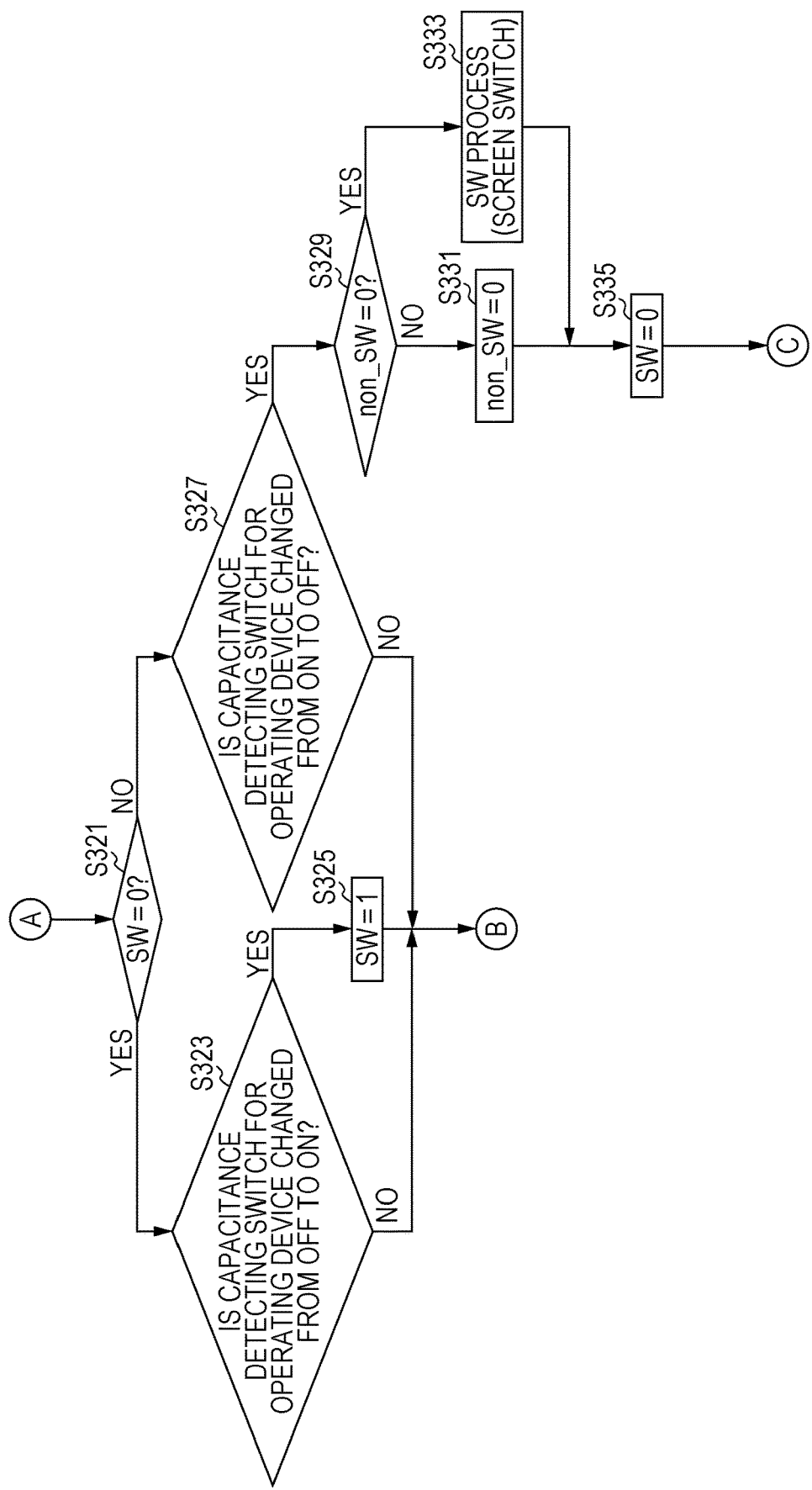

SWITCH OPERATION ERRONEOUS-DETECTION AVOIDANCE DEVICE AND MULTIFUNCTIONAL MACHINE, AND SWITCH OPERATION ERRONEOUS-DETECTION AVOIDANCE METHOD

The present application is a divisional application of U.S. patent application Ser. No. 16/161,794, filed on Oct. 16, 2018, which claims priority to Japanese Patent Application No. 2017-200363 filed on Oct. 16, 2017. The entire disclosure of such parent application is incorporated herein by reference.

BACKGROUND

1. Field

The present disclosure relates to a switch operation erroneous-detection avoidance device, a multifunctional machine having the switch operation erroneous-detection avoidance device, and a switch operation erroneous-detection avoidance method.

2. Description of the Related Art

In some cases, a multifunctional machine by adding a network connection function, a facsimile function, a data communication function, a data input/output function, a data storage function, and the like to an image copying apparatus including an image forming apparatus and an image reading apparatus, includes an operation panel unit having an NFC reader/writer for performing near field communication (NFC) with an NFC mobile terminal in addition to operation buttons. Here, the NFC reader/writer includes an NFC antenna and an NFC controller.

Meanwhile, in the operation panel unit, for example, when a capacitive operation button and the NFC antenna of the NFC reader/writer are close to each other, a mobile terminal such as a smartphone having an NFC function also covers a vicinity of a switch so as to perform the NFC with the NFC reader/writer In a case where a capacitance detection switch is used as the switch, when the mobile terminal as a conductor covers an upper surface of the switch, capacitance changes, so that the capacitance detection switch reacts to the approaching mobile terminal which functions as a conductor. In addition, an optical switch reacts when a mobile terminal conductor which functions as a shield approaches the optical switch. Further, a mechanical switch reacts when the mobile terminal pushes the switch.

It is assumed that the mobile terminal for performing the NFC with the multifunctional machine is placed on the operation panel unit and a capacitive type, optical type, or mechanical type operation switch which is the operation panel unit is pressed by the mobile terminal. FIG. 1A is a diagram illustrating a normal method for prohibiting a process associated with the operation switch from being activated in this case. The normal method uses that if a state of the operation switch is changed from an unpressed state to a pressed state while the NFC is executing, it is possible to determine that the change is not caused by the operation switch being pressed by a user but caused by the operation switch being apparently pressed by the mobile terminal.

However, as illustrated in FIG. 1B, in some cases, the NFC is started between the multifunctional machine and the mobile terminal as the state of the operation switch is changed from the unpressed state to the pressed state by the mobile terminal. In this case, it is not possible to prohibit the process associated with the operation switch from being activated.

Japanese Unexamined Patent Application Publication No. 2016-74164 disclosures an operation control unit which beforehand detects a magnetic field output from a mobile terminal such as a smartphone and invalidates an operation corresponding to activation of a printing process of a key disposed in an operation unit so that a frequency of occurrence of erroneous operations in an operation unit by a user is reduced. In a case where the magnetic field may be not beforehand detected, Japanese Unexamined Patent Application Publication No. 2016-74164 disclosures a method of canceling an immediately previous switch input in a case where the magnetic field is detected during a predetermined period after the switch is input.

However, in the method of Japanese Unexamined Patent Application Publication No. 2016-74164, since the magnetic field is detected during the predetermined period after the switch is input also in a case of normal use, the input determination of the switch is delayed. In addition, in a case where a desired switch operation and a desired NFC operation are continuously and quickly performed, in some cases, the desired switch operation may be canceled.

SUMMARY

It is desirable to provide a switch operation erroneous-detection avoidance device, a multifunctional machine including the switch operation erroneous-detection avoidance device, and a switch operation erroneous-detection avoidance method which, in a case where an operation switch is apparently pressed by an object other than an operation by a user, avoid an erroneous detection that the operation is caused by the user and do not interfere with operability of a normal operation switch by the user.

According to an aspect of the disclosure, there is provided a switch operation erroneous-detection avoidance device including: an execution control unit that if a prescribed device executes a prescribed process with a portable object when an operation switch transits from a pressed state to an unpressed state, prohibits execution of a process associated with the operation switch and if the prescribed device does not execute the prescribed process with the portable object when the operation switch transits from the pressed state to the unpressed state, permits the execution of the process associated with the operation switch.

According to another aspect of the disclosure, there is provided a multifunctional machine that includes the switch operation erroneous-detection avoidance device.

According to still another aspect of the disclosure, there is provided a switch operation erroneous-detection avoidance method including: determining whether or not a prescribed device executes a prescribed process with a portable object when an operation switch transits from a pressed state to an unpressed state, and prohibiting execution of a process associated with the operation switch in a case where it is determined that the prescribed process is executed in the determining and permitting the execution of the process associated with the operation switch in a case where it is determined that the prescribed process is not executed in the determining.

BRIEF DESCRIPTION OF THE DRAWINGS

FIGS. 1A and 1B are diagrams of first and second timings for explaining an operation switch press erroneous-detection avoidance method in the related art;

FIGS. 3A and 3B are diagrams of second and third timings for explaining the operation switch press erroneous-detection avoidance method according to the first embodiment of the present disclosure;

FIG. 5 is a diagram of a first timing for explaining an operation switch press erroneous-detection avoidance method according to a second embodiment of the present disclosure;

FIGS. 7A and 7B are diagrams of fourth and fifth timings for explaining the operation switch press erroneous-detection avoidance method according to the second embodiment of the present disclosure;

FIG. 8 is a diagram of a sixth timing for explaining the operation switch press erroneous-detection avoidance method according to the second embodiment of the present disclosure;

FIG. 9 is a diagram of a first timing for explaining an operation switch press erroneous-detection avoidance method according to a third embodiment of the present disclosure;

FIGS. 10A and 10B are diagrams of second and third timings for explaining the operation switch press erroneous-detection avoidance method according to the third embodiment of the present disclosure;

FIGS. 11A and 11B are diagrams of fourth and fifth timings for explaining the operation switch press erroneous-detection avoidance method according to the third embodiment of the present disclosure;

FIGS. 12A and 12B are diagrams of sixth and seventh timings for explaining the operation switch press erroneous-detection avoidance method according to the third embodiment of the present disclosure;

FIG. 20A is a flowchart (1/2) for explaining an operation switch press erroneous-detection avoidance method according to Example 4 of the present disclosure; and FIG. 20B is a flowchart (2/2) for explaining an operation switch press erroneous-detection avoidance method according to Example 4 of the present disclosure.

DESCRIPTION OF THE EMBODIMENTS

Hereinafter, embodiments of the present disclosure will be described in detail with reference to the accompanying drawings.

Figure 13:
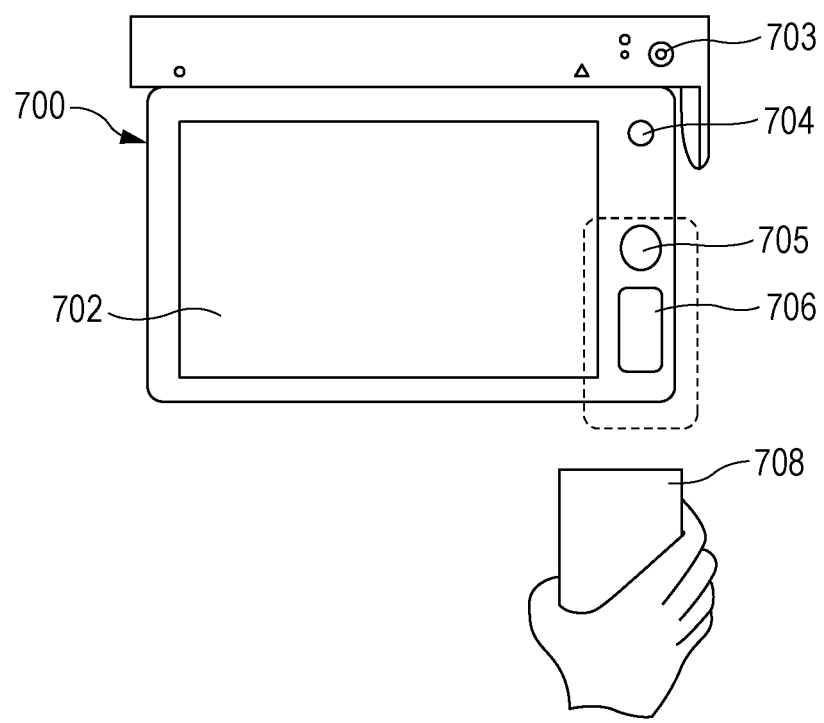
FIG. 13 is a front view illustrating an appearance of an operation panel unit according to the embodiment of the present disclosure.
Figure 14:
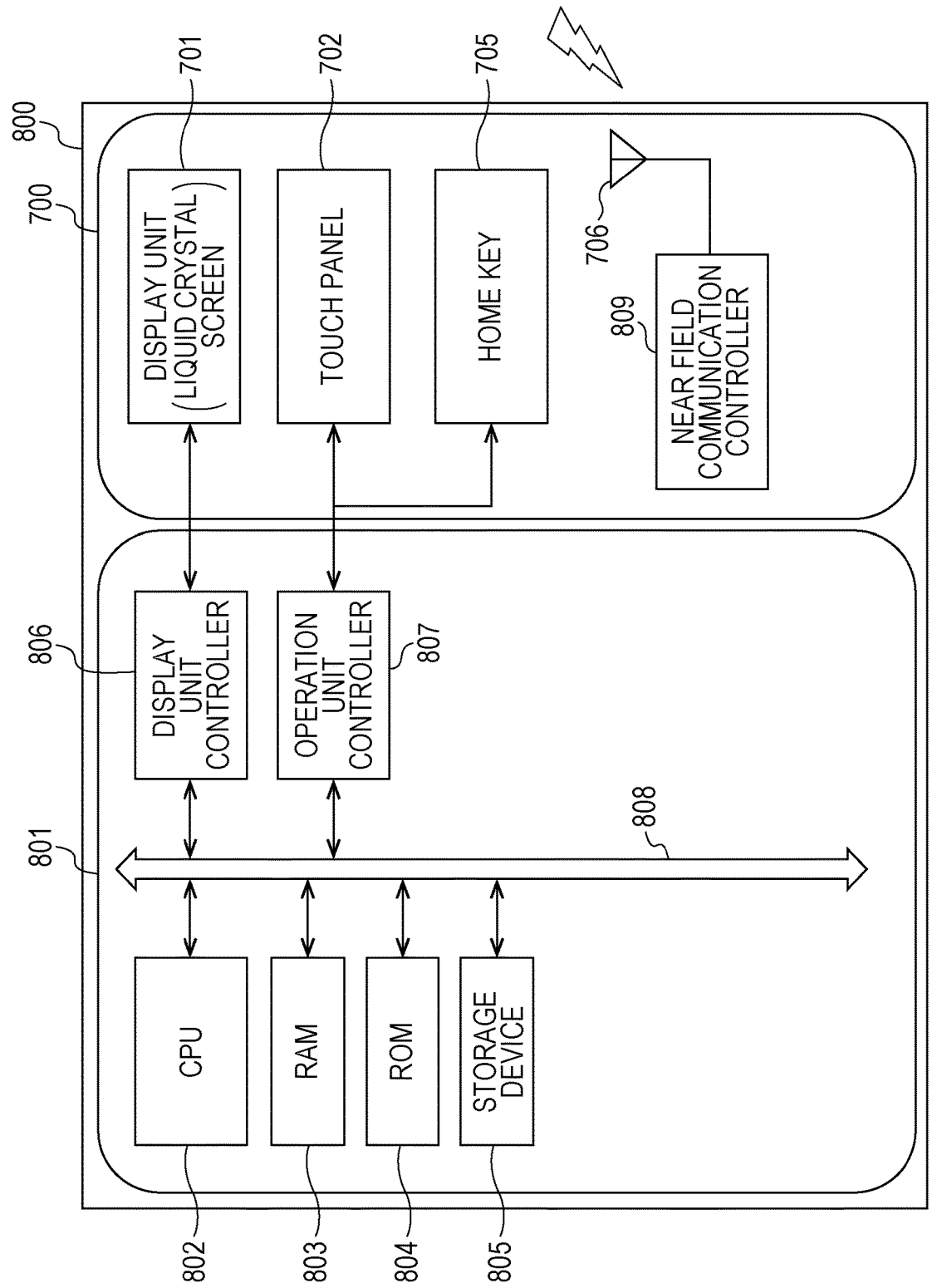
FIG. 14 is a functional block diagram illustrating a configuration of the operation panel unit or the like according to the embodiment of the present disclosure.

FIGS. 13 and 14 are diagrams illustrating an example of an operation panel unit according to the present embodiment. An operation panel unit 700 includes a display unit (liquid crystal screen) 701, a touch panel 702, a power key 703, a power saving switch 704, a home switch 705, an NFC antenna 706, and a near field communication (NFC) controller 809 (not illustrated).

The operation panel unit 700 is a unit which instructs a process related to an overall operation of a multifunctional machine. The display unit (liquid crystal screen) 701 is a device for displaying desired information. The touch panel 702 is a device of which at least a part is overlapped with the display unit 701 and which detects a position pressed by a user's finger or the like by a mechanical contact point or a capacitance change and transmits two-dimensional coordinates of the position to the multifunctional machine. The power key 703 is a key for switching between power-on and power-off in the multifunctional machine and includes a mechanical contact point. The power saving switch 704 is a capacitive switch for causing the multifunctional machine to move to a power saving mode. The home switch 705 is a capacitive switch for causing the display unit 701 to display a home screen. The NFC antenna 706 is a loop coil antenna for performing NFC. The near field communication (NFC) controller 809 performs a communication process with the mobile terminal such as a smartphone connected via the NFC antenna 706 and is a device capable of communicating with a CPU 802 to be described below.

With further reference to FIG. 14, a multifunctional machine 800 includes the operation panel unit 700 described above and a controller unit 801. The controller unit 801 includes a central processing unit (CPU) 802, a random access memory (RAM) 803, a read only memory (ROM) 804, a storage device 805, a display unit controller 806, an operation unit controller 807, and a bus 808 connected with the central processing unit (CPU) 802, the random access memory (RAM) 803, the read only memory (ROM) 804, the storage device 805, the display unit controller 806, and the operation unit controller 807.

The central processing unit (CPU) 802 transmits a program stored in the read only memory (ROM) 804 to the random access memory (RAM) 803 and reads and executes the program to control each of units or realize a function of each of the units of the multifunctional machine 800.

The storage device 805 is, for example, a hard disk drive and stores image data input from an image input device included in the multifunctional machine, a network, a mobile terminal, a memory card, or the like connected to the multifunctional machine.

The display unit controller 806 is a controller for causing the display unit 701 to display a screen. The operation unit controller 807 is a controller for recognizing an input to the touch panel 702 and a key such as the power key 703, the power saving switch 704, or the home switch 705.

With reference to FIG. 13, the user brings the mobile terminal 708 close to the NFC antenna 706 so as to cover the NFC antenna 706 so that a mobile terminal 708 performs NFC with the NFC reader/writer. If the mobile terminal 708 covers an area indicated by a dashed rectangle in FIG. 13, the mobile terminal 708 approaches the home switch 705 inside the area. In this case, there is a possibility that the home switch 705 erroneously recognizes the approaching mobile terminal 708 as an operation by the user. The present embodiment may avoid the erroneous recognition.

In the following description, a case where a state of the operation switch is changed from an unpressed state to a pressed state by the operation switch such as the home switch 705 or the power saving switch 704 being pressed, is referred to as "switch-down" or simply referred to as "down". A case where the state of the operation switch is changed from the pressed state to the unpressed state by the pressed operation switch being released, is referred to as "switch-up" or simply referred to as "up". In addition, a state in which the operation switch is pressed, is referred to as "switch-press".

The switch-down, the switch-up, or the switch-press also occurs by bringing the mobile terminal close to the operation switch.

First Embodiment

Figure 2:
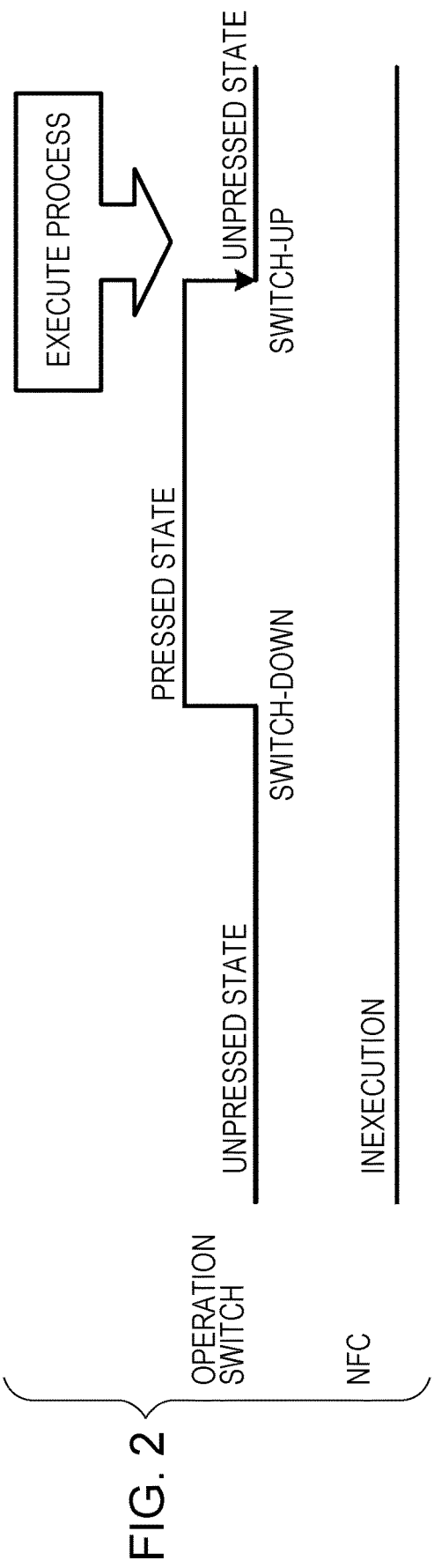
FIG. 2 is a diagram of a first timing for explaining an operation switch press erroneous-detection avoidance method according to a first embodiment of the present disclosure.

FIGS. 2, 3A, and 3B are diagrams of timings of a case where an operation switch press erroneous-detection avoidance method according to the first embodiment is executed.

FIG. 2 illustrates a case where the user's finger or the like presses the operation switch. Since the NFC is not executed at the time of not the switch-down but the switch-up according to the operation switch being pressed, it is determined that the switch-up occurs by the operation switch being pressed by the user's finger or the like and the process associated with the operation switch is activated.

FIGS. 3A and 3B illustrate a case where the mobile terminal for performing the NFC presses the operation switch and the switch-up occurs before the NFC is completed. Since the NFC is executed at the time of not the switch-down but the switch-up according to the operation switch being pressed, it is determined that the switch-up occurs by the operation switch being apparently pressed by the mobile terminal and the activation of the process associated with the operation switch is avoided. In particular, FIG. 3A illustrates a case where the switch-down occurs after the NFC is started and FIG. 3B illustrates a case where the NFC is started after the switch-down occurs.

In this way, in a case where the operation switch is pressed, if the press is performed by the user's finger or the like, the press may normally be detected, but if the press is performed by the mobile terminal, it is possible to avoid an erroneous detection that the press is caused by the user's finger or the like. Therefore, it is assumed that the operation switch is pressed by the user's finger. It is possible to appropriately determine whether to execute the process associated with the operation switch or to avoid the process associated with the operation switch from being activated. In particular, in both cases of FIGS. 3A and 3B, it is determined that the switch-up is caused by the operation switch being apparently pressed by the mobile terminal. Therefore, it is possible to avoid the process associated with the operation switch from being activated.

Second Embodiment

Figure 4:
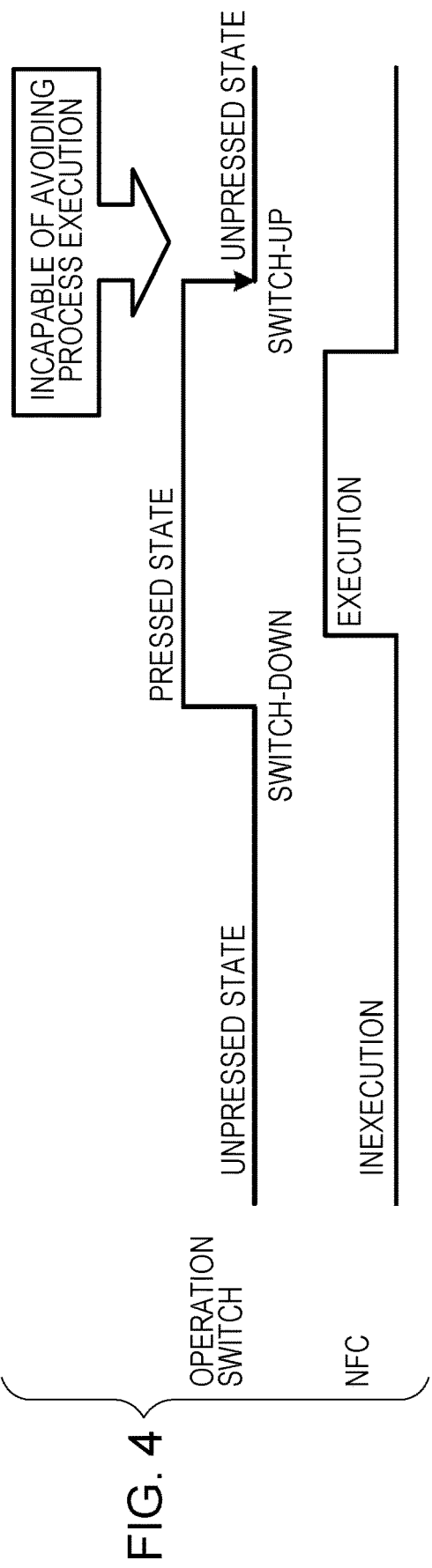
FIG. 4 is a diagram of a fourth timing for explaining the operation switch press erroneous-detection avoidance method according to the first embodiment of the present disclosure.

FIG. 4 is a diagram of a timing of a case where the switch-up of the operation switch occurs after the NFC is completed in the first embodiment.

In the first embodiment, since the process corresponding to the operation switch is activated if the NFC is not executed when the switch-up occurs, in the case of FIG. 4, the process corresponding to the operation switch is activated. However, as illustrated that the NFC execution period and the switch-press period are overlapped with each other, FIG. 4 illustrates a state in which the operation button is apparently pressed by the mobile terminal. Therefore, the process execution can be originally avoided, but the process execution may not be avoided.

The second embodiment is for reducing this case. The second embodiment uses a prohibition flag INH which is set to 1 at the same time as the NFC start and is reset to zero after a period T elapses since the NFC is completed. If the prohibition flag INH is reset when the switch-up occurs, the process associated with the operation switch is activated. If the prohibition flag INH is set, the activation of the process associated with the operation switch is avoided.

FIG. 5 illustrates a case where the user's finger or the like presses the operation switch. Since the NFC is not executed until the time of not the switch-down but the switch-up according to the operation switch being pressed, based on the prohibition flag INH set to zero, it is determined that the switch-up occurs by the operation switch being pressed by the user's finger or the like and the process associated with the operation switch is activated.

Figure 6A:
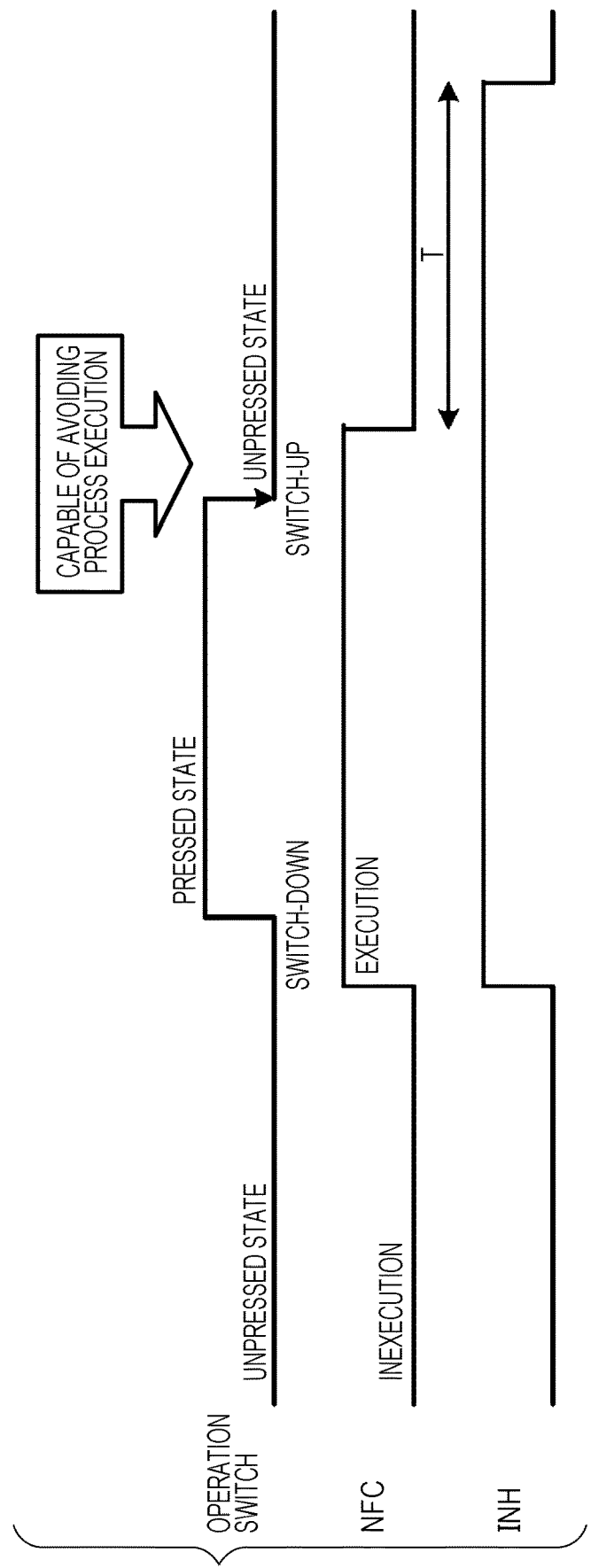
FIGS. 6A and 6B are diagrams of second and third timings for explaining the operation switch press erroneous-detection avoidance method according to the second embodiment of the present disclosure.
Figure 6B:
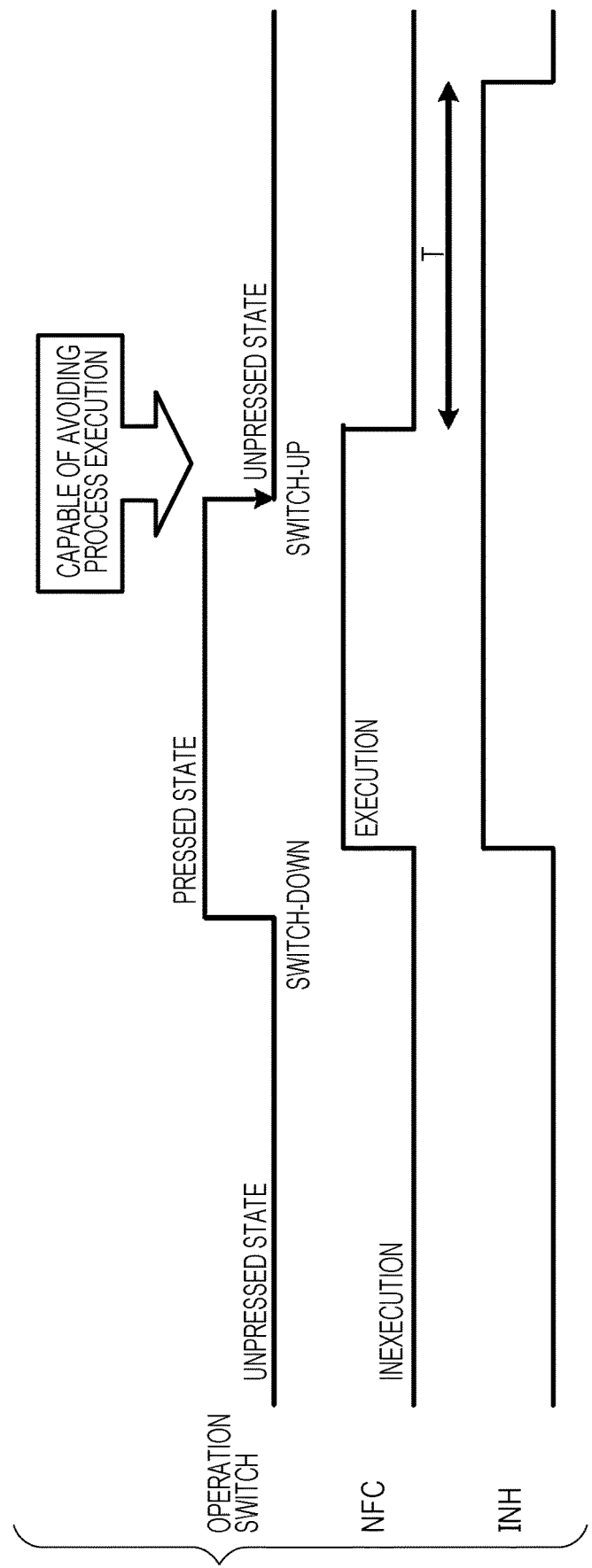

FIGS. 6A and 6B illustrate a case where the mobile terminal for performing the NFC presses the operation switch. The prohibition flag INH is set to 1 during a period when the NFC is executed and the period T continued after the period when the NFC is executed. Since the switch-up according to the operation switch being pressed occurs during the NFC execution period, the prohibition flag INH is set to 1 at the time of the switch-up. It is determined that the switch-up is caused by the operation switch being apparently pressed by the mobile terminal and the activation of the process associated with the operation switch is avoided. In particular, FIG. 6A illustrates a case where the switch-down occurs after the NFC is started and FIG. 6B illustrates a case where the NFC is started after the switch-down occurs.

In this way, in a case where the operation switch is pressed, if the press is performed by the user's finger or the like, the press may normally be detected, but if the press is performed by the mobile terminal, it is possible to avoid an erroneous detection that the press is caused by the user's finger or the like. Therefore, it is assumed that the operation switch is pressed by the user's finger. It is possible to appropriately determine whether to execute the process associated with the operation switch or to avoid the process associated with the operation switch from being activated. In particular, in both cases of FIGS. 6A and 6B, it is determined that the switch-up is caused by the operation switch being apparently pressed by the mobile terminal. Therefore, it is possible to avoid the process associated with the operation switch from being activated.

Figure 7A:
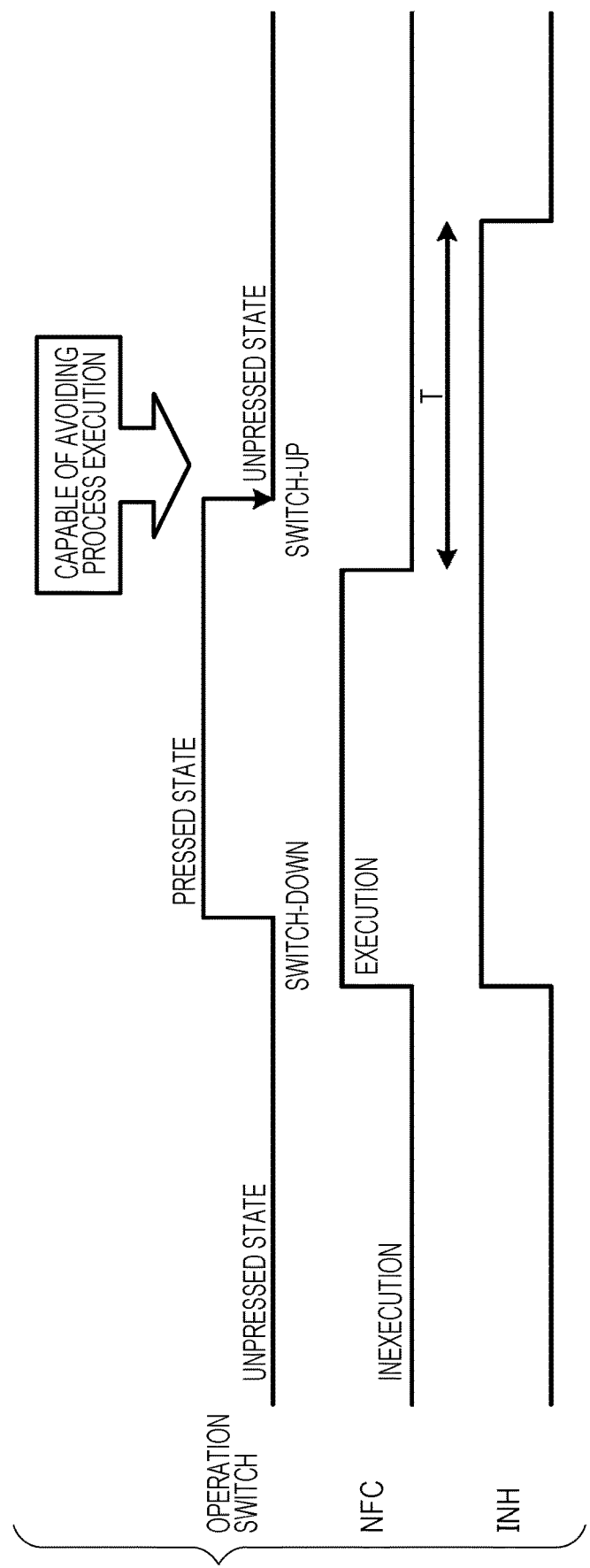

FIGS. 7A and 7B illustrate a case where the mobile terminal for performing the NFC presses the operation switch. Since the prohibition flag INH is set to 1 during a period when the NFC is executed and the period T continued after the period when the NFC is executed, in a case where the switch-up according to the operation switch being pressed occurs during the period T continued after the NFC execution is completed, it is determined that the switch-up occurs by the operation switch being apparently pressed by the mobile terminal and the activation of the process associated with the operation switch is avoided. In particular, FIG. 7A illustrates a case where the switch-down occurs after the NFC is started and FIG. 7B illustrates a case where the NFC is started after the switch-down occurs.

In this way, in a case where the operation switch is pressed, if the press is performed by the user's finger or the like, the press may normally be detected, and if the press is performed by the mobile terminal, it is possible to avoid an erroneous detection that the press is caused by the user's finger or the like. Therefore, it is assumed that the operation switch is pressed by the user's finger. It is possible to appropriately determine whether to execute the process associated with the operation switch or to avoid the process associated with the operation switch from being activated.

Third Embodiment

FIG. 8 illustrates an example in which in the second embodiment, in the case where the switch-up occurs since the NFC is completed, it is possible to avoid the process execution, but if immediately thereafter, the operation switch is pressed by the user's finger or the like, the prohibition flag INH remaining 1 is damaged and the process related to the operation switch may not be activated.

The third embodiment is for reducing this case. In the third embodiment, the prohibition flag INH is set to 1 at the same time as the NFC start and is reset to zero at an earlier time between the time when the period T elapses after the NFC execution is completed or the time when the switch-up occurs.

Therefore, as illustrated in FIG. 12A, in the case where the switch-up occurs until the period T elapses since the NFC is started and the NFC is completed, it is possible to avoid the process execution, but if at the same time, the prohibition flag INH is reset to zero and immediately thereafter, the operation switch is pressed by the user's finger or the like, it is possible to activate the process related to the operation switch.

FIG. 9 illustrates a case where the user's finger or the like presses the operation switch in the third embodiment. Since the NFC is not executed at the time of not the switch-down but the switch-up according to the operation switch being pressed, based on the prohibition flag INH set to zero, it is determined that the switch-up occurs by the operation switch being pressed by the user's finger or the like and the process associated with the operation switch is activated.

Figure 10B:
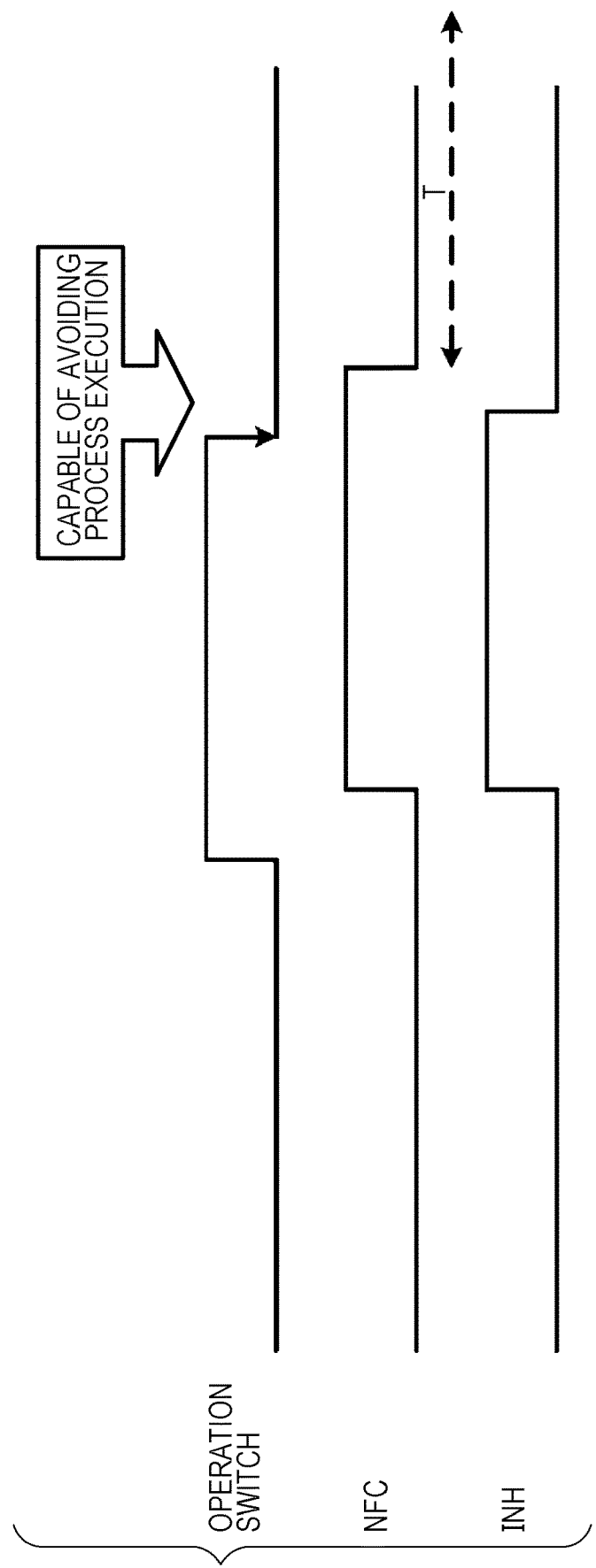

FIGS. 10A and 10B illustrate a case where the mobile terminal for performing the NFC presses the operation switch. The prohibition flag INH is set to 1 as the NFC is started. Since the switch-up according to the operation switch being pressed occurs during the NFC execution period, the prohibition flag INH is set to 1 at the time of the switch-up. It is determined that the switch-up is caused by the operation switch being apparently pressed by the mobile terminal and the activation of the process associated with the operation switch is avoided. At the same time, the prohibition flag INH is reset to zero. In particular, FIG. 10A illustrates a case where the switch-down occurs after the NFC is started and FIG. 10B illustrates a case where the NFC is started after the switch-down occurs.

In this way, in a case where the operation switch is pressed, if the press is performed by the user's finger or the like, the press may normally be detected, but if the press is performed by the mobile terminal, it is possible to avoid an erroneous detection that the press is caused by the user's finger or the like. Therefore, it is assumed that the operation switch is pressed by the user's finger. It is possible to appropriately determine whether to execute the process associated with the operation switch or to avoid the process associated with the operation switch from being activated. In particular, in both cases of FIGS. 10A and 10B, it is determined that the switch-up is caused by the operation switch being apparently pressed by the mobile terminal. Therefore, it is possible to avoid the process associated with the operation switch from being activated.

Figure 11A:
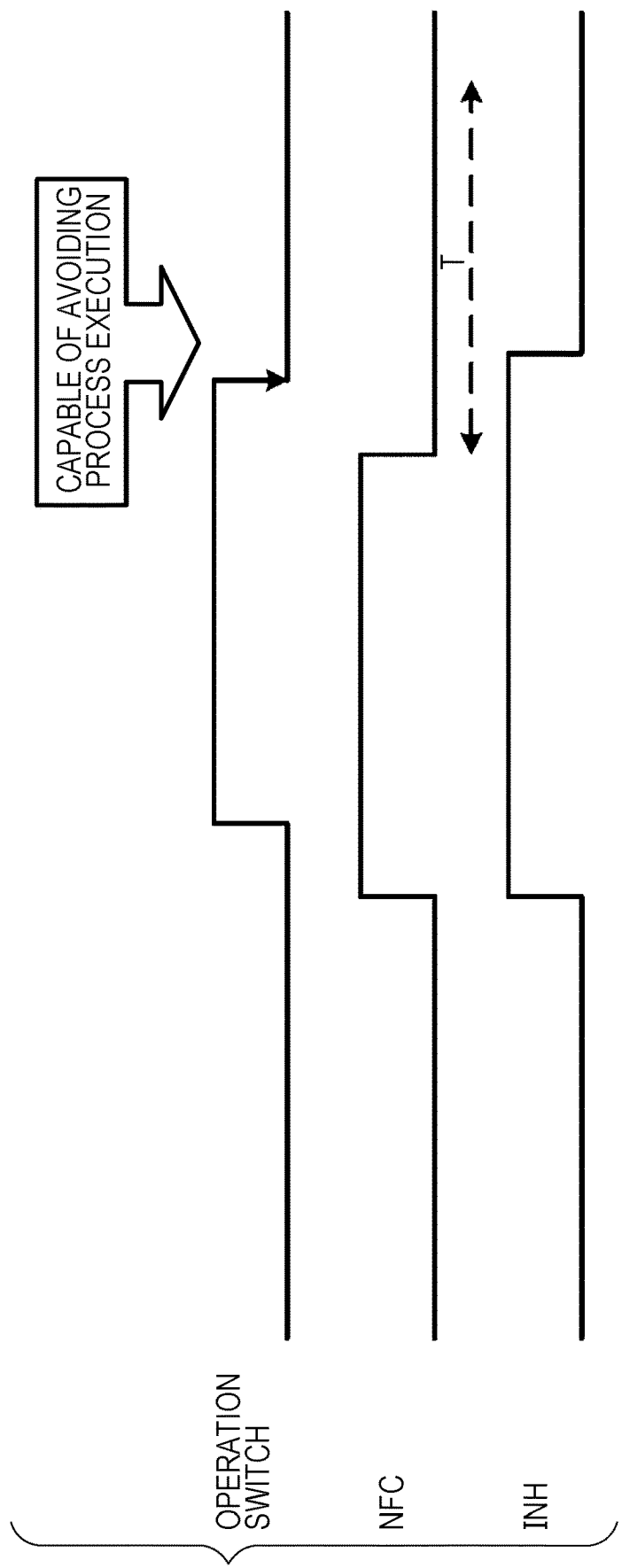

FIGS. 11A and 11B illustrate a case where the mobile terminal for performing the NFC presses the operation switch. The prohibition flag INH is set to 1 as the NFC is started. Since the switch-up according to the operation switch being pressed occurs during the period T continued after the NFC execution is completed, the prohibition flag INH is set to 1 at the time of the switch-up. It is determined that the switch-up is caused by the operation switch being apparently pressed by the mobile terminal and the activation of the process associated with the operation switch is avoided. At the same time, the prohibition flag INH is reset to zero. In particular, FIG. 11A illustrates a case where the switch-down occurs after the NFC is started and FIG. 11B illustrates a case where the NFC is started after the switch-down occurs.

In this way, in a case where the operation switch is pressed, if the press is performed by the user's finger or the like, the press may normally be detected, but if the press is performed by the mobile terminal, it is possible to avoid an erroneous detection that the press is caused by the user's finger or the like. Therefore, it is assumed that the operation switch is pressed by the user's finger. It is possible to appropriately determine whether to execute the process associated with the operation switch or to avoid the process associated with the operation switch from being activated. In particular, in both cases of FIGS. 11A and 11B, it is determined that the switch-up is caused by the operation switch being apparently pressed by the mobile terminal. Therefore, it is possible to avoid the process associated with the operation switch from being activated.

FIG. 12A illustrates a case where the switch-down and the switch-up occur according to the operation switch being pressed by the user since the operations in FIGS. 10A, 10B, 11A, 11B are completed and it is possible to activate the process associated with the operation button. In particular, even in a case where the switch-up occurs before the period T elapses after the NFC is completed, it is possible to activate the process associated with the operation button.

FIG. 12B illustrates that if the period T elapses after the NFC is completed and the prohibition flag INH is reset, in a case where the switch-up according to the operation button being pressed by the user's finger or the like occurs even if there is no switch-up according to the completion of the NFC, it is possible to activate the process associated with the operation button.

According to the first to third embodiments, after the operation switch is pressed, the operation input is determined when the finger is released from the operation switch. In the device including both of a capacitance detection switch and a near field communication system for operating the device, in a case where magnetic detection or the NFC is performed before the capacitance detection switch for operating the device is pressed and reacts or while the capacitance detection switch is pressed and reacts, the operation input is invalidated even if the press of the capacitive operation switch for operating the device is detected. Here, the period of the NFC execution in the first to third embodiments may include a period when the NFC antenna detects the approaching mobile terminal even if the NFC is not executed in addition to the period when the NFC is actually executed.

As the mobile terminal approaches the NFC antenna, the capacitance detection switch for operating the device detects the mobile terminal as a conductor and is turned ON, but if the NFC is executed until the mobile terminal is released from the NFC antenna, the operation is an unintended operation of the user. It is possible to avoid malfunction as the input the capacitance detection switch for operating the device is invalidated. By providing the present disclosure, it becomes possible to include the near field communication (NFC) system and the capacitance detection switch. Even in a case of bringing the mobile terminal faster than a voltage in an antenna coil is generated, that is, a case where a magnetic field may be not beforehand detected, it is possible to avoid the operation other than the desired operation of the user from being executed. In addition, in the embodiment, since it is possible to determine the detection of the magnetic field by the NFC antenna after the operation switch is pressed, the input determination of the operation switch is possible during a short time than Japanese Unexamined Patent Application Publication No. 2016-74164. For this reason, even in a case of normal use, the input determination of the operation switch is not delayed. Also in a case where the desired switch operation and the desired NFC operation are continuously and quickly performed, since the immediately previous switch operation is not canceled, it is possible to activate the device as desired.

Fourth Embodiment

Figure 15:
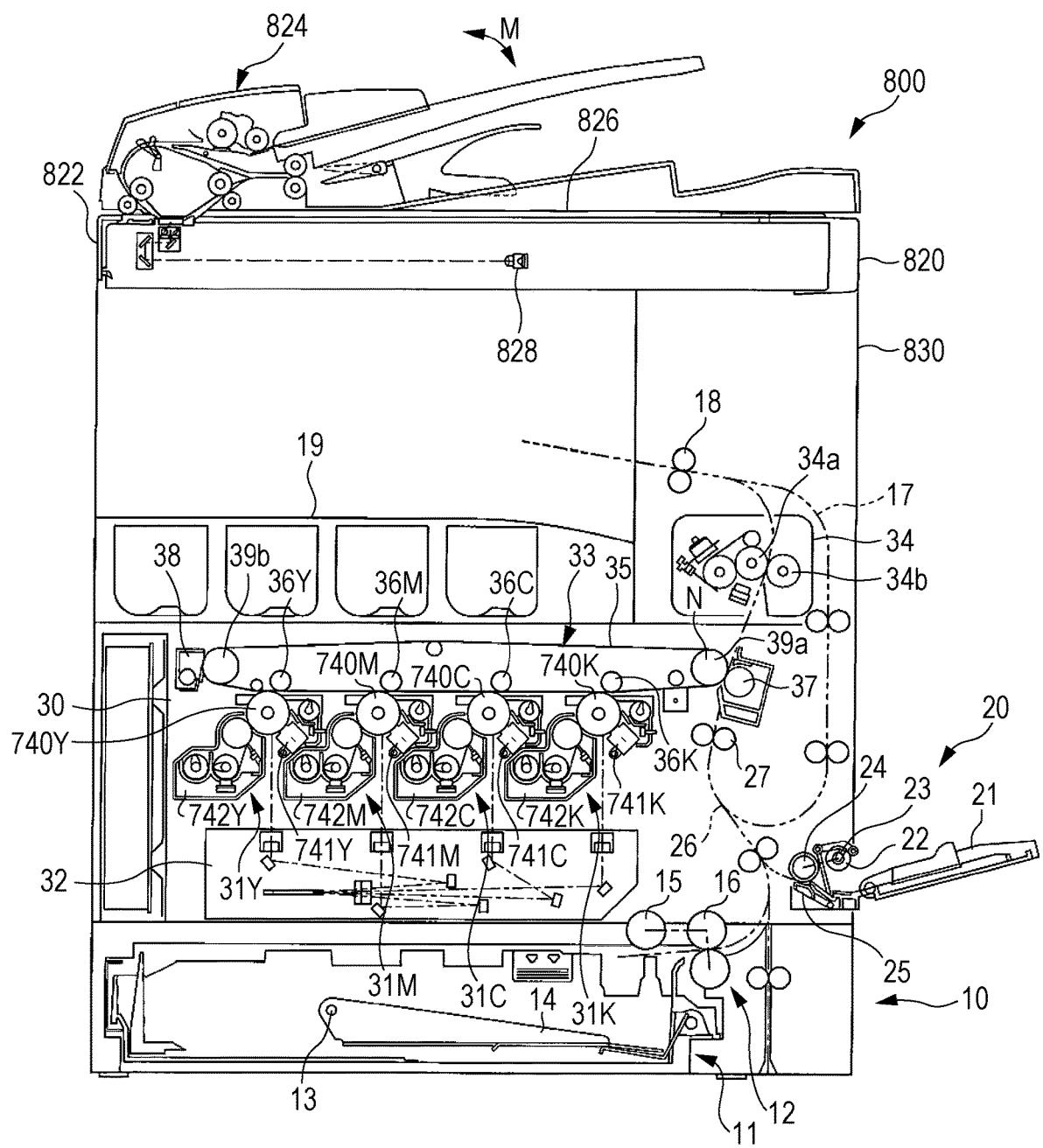
FIG. 15 is a conceptual cross-section diagram illustrating a multifunctional machine according to the fourth embodiment of the present disclosure.
Figure 16:
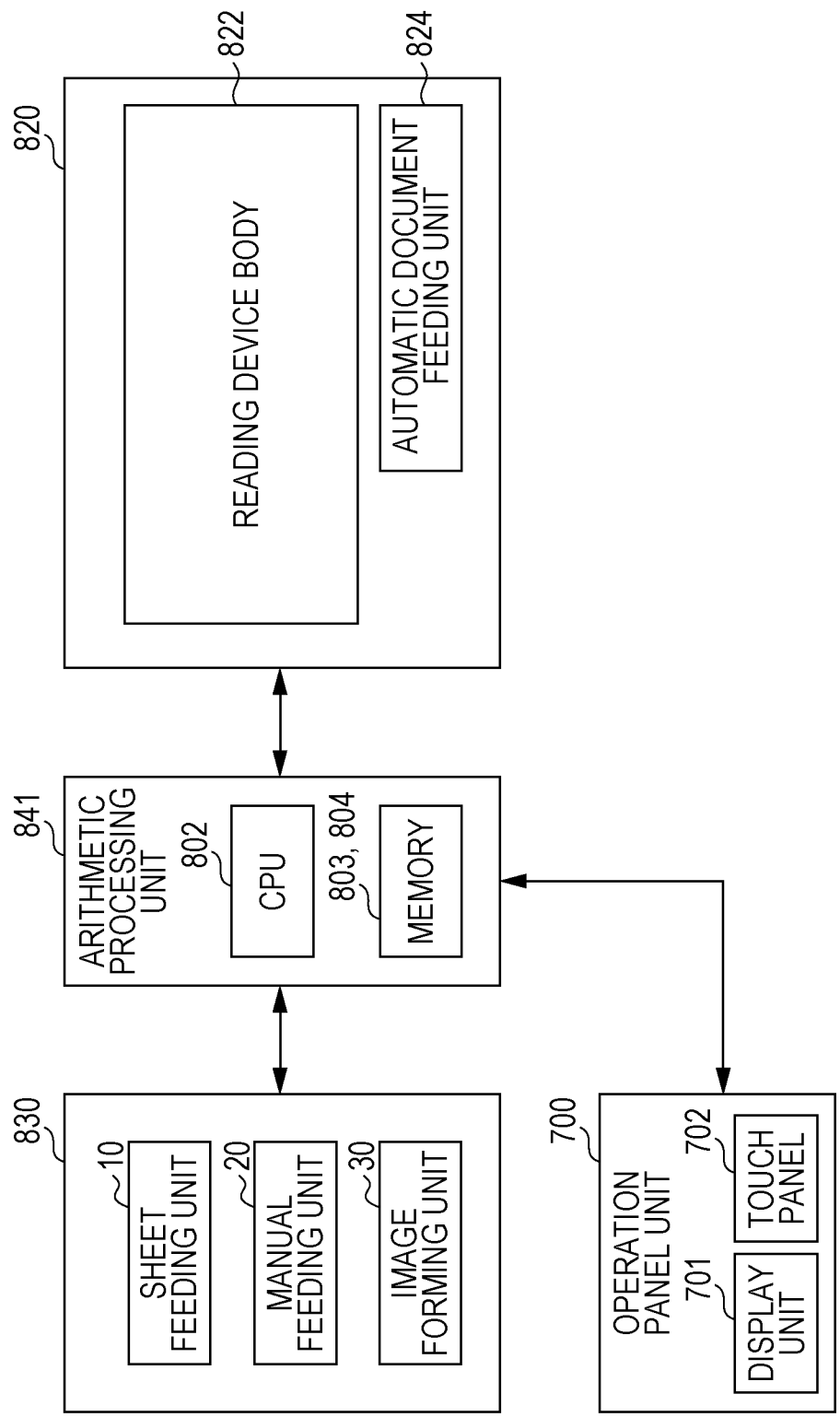
FIG. 16 is a functional block diagram illustrating the multifunctional machine according to the fourth embodiment of the present disclosure.

The fourth embodiment is related to the multifunctional machine 800 including a document reading device according to the first to third embodiments. FIGS. 15 and 16 illustrate a configuration of the multifunctional machine 800.

As illustrated in FIGS. 15 and 16, the multifunctional machine 800 includes a document reading device 820 which reads an image of a document, a multifunctional machine body (image forming unit body) 830 which forms an image on a sheet, the operation panel unit 700 which operates the document reading device 820 and the multifunctional machine body 830, and an arithmetic processing unit 841 which controls the document reading device 820 and the multifunctional machine body 830 based on the operation of the operation panel unit 700.

The single document reading device 820 may be used for reading the image or single multifunctional machine body 830 may be used for forming the image, and the document reading device 820 and the multifunctional machine body 830 may be interworked with each other for copying the image. In addition, the multifunctional machine 800 may include a storage device and a facsimile device (not illustrated). The storage device can store the image read by the document reading device 820 or the image received by the facsimile device. The facsimile device can transmit the image read by the document reading device 820 or the image stored in the storage device and can receive the image from an outside. Further, the multifunctional machine 800 may include an interface for connecting with a personal computer via a network. The personal computer connected to the multifunctional machine 800 can use a function of the multifunctional machine for data which the personal computer can manage.

The document reading device 820 includes an automatic document feeding unit (single pass feeder: SPF) 824 for automatically feeding a document and a reading device body 822 which reads the image of the document. In addition to the components illustrated in FIG. 16, the document reading device 820 also includes the components illustrated in FIG. 15 although not illustrated in FIG. 16. Further, as illustrated in FIG. 15, the reading device body 822 includes a document stand 826.

The multifunctional machine body 830 includes a sheet feeding unit 10 which feeds the sheet, a manual feeding unit 20 capable of manually feeding the sheet, and an image forming unit 30 which forms the image on the sheet fed by the sheet feeding unit 10 or the manual feeding unit 20.

The sheet feeding unit 10 includes a sheet loading unit 11 which loads the sheet and a separate feeding unit 12 which separately feeds the sheet one by one loaded in the sheet loading unit 11. The sheet loading unit 11 includes a middle plate 14 which pivots around a rotation shaft 13 and the middle plate 14 pivots and lifts the sheet upward when the sheet is fed. The separate feeding unit 12 includes a pickup roller 15 which feeds the sheet lifted by the middle plate 14 and a separation roller pair 16 which separate the sheet one by one fed by the pickup roller 15.

The manual feeding unit 20 includes a manual feed tray 21 which can load the sheet and a separate feeding unit 22 which separately feeds the sheet one by one loaded in the manual feed tray 21. The manual feed tray 21 is rotatably supported by the multifunctional machine body 830 and can load the sheet by being fixed at a prescribed angle when the sheet is manually fed. The separate feeding unit 22 includes a pickup roller 23 which feeds the sheet loaded in the manual feed tray 21, and a separation roller 24 and a separation pad 25 which separate the sheet one by one fed by the pickup roller 23.

The image forming unit 30 includes four process cartridges 31Y to 31K for forming the image of yellow (Y), magenta (M), cyan (C), and black (K), photosensitive drums 740Y to 740K to be described below, an exposure device 32 for exposing surfaces of the photosensitive drums 740Y to 740K, a transfer unit (transfer device) 33 for transferring a toner image formed on the surfaces of the photosensitive drums 740Y to 740K to the sheet, and a fixing unit 34 which fixes the transferred toner image to the sheet. The alphabets (Y, M, C, and K) added at an end of the code indicate the respective colors (yellow, magenta, cyan, and black).

Each of the four process cartridges 31Y to 31K is configured to be detachable from the multifunctional machine body 830 and is exchangeable. Since the four process cartridges 31Y to 31K have the same configuration except that the colors of the images to be formed are different, only the configuration of the process cartridge 31Y for forming the image of yellow (Y) will be described, and the description of the process cartridges 31M to 31K will be omitted.

The process cartridge 31Y includes the photosensitive drum 740Y as an image carrier, a charger 741Y for charging the photosensitive drum 740Y, a developing device 742Y for developing an electrostatic latent image formed on the photosensitive drum 740Y, and a drum cleaner for removing toner remaining on the surface of the photosensitive drum 740Y. The developing device 742Y includes a developing device body (not illustrated in detail) for developing the photosensitive drum 740Y and a toner cartridge (not illustrated in detail) for supplying the toner to the developing device body. The toner cartridge is configured to be detachable from the developing device body. When the stored toner is exhausted, the toner cartridge can be detached from the developing device body and the toner can be exchanged.

The exposure device 32 includes a light source (not illustrated) for irradiating a laser beam, a plurality of mirrors (not illustrated) for guiding the laser beam to the photosensitive drums 740Y to 740K, and the like. The transfer unit 33 includes an intermediate transfer belt 35 which carries the toner image formed on the photosensitive drums 740Y to 740K, primary transfer rollers 36Y to 36K which primarily transfer the toner images formed on the photosensitive drums 740Y to 740K to the intermediate transfer belt 35, a secondary transfer roller 37 which secondarily transfers the toner image transferred to the intermediate transfer belt 35 to the sheet, and a belt cleaner 38 which removes the toner remaining on the intermediate transfer belt 35. The intermediate transfer belt 35 is wound around a driving roller 39*a* and a driven roller 39*b* and is pushed against the photosensitive drums 740Y to 740K by the primary transfer rollers 36Y to 36K. The secondary transfer roller 37 nips (clamps) the intermediate transfer belt 35 with the driving roller 39*a* and transfers the toner image carried by the intermediate transfer belt 35 to the sheet at a nip unit N. The fixing unit 34 includes a heating roller 34*a* for heating the sheet and a pressure roller 34*b* for pressing the heating roller 34*a*.

The operation panel unit 700 includes the display unit 701 which displays prescribed information and the touch panel 702 for the user to input an instruction to the document reading device 820 and the multifunctional machine body 830. In the present embodiment, the operation panel unit 700 is disposed on a front side of the reading device body 822. The front side corresponds to a front side of a page FIG. 15 and a back side corresponds to a rear side of FIG. 15.

As illustrated in FIG. 16, the arithmetic processing unit 841 includes the CPU 802 which drives and controls the sheet feeding unit 10, the manual feeding unit 20, the image forming unit 30, and the document reading device 820, and the memory 803 and the memory 804 which store various programs for operating the CPU 802 and various information used by the CPU 802. The arithmetic processing unit 841 generally controls operations of the sheet feeding unit 10, the manual feeding unit 20, the image forming unit 30, and the document reading device 820 and forms the image on the sheet based on an operation to the operation panel unit 700 by the user.

Next, an image forming operation (image forming control by arithmetic processing unit 841) by the multifunctional machine 800 configured as described above will be described. In the present embodiment, as an example, the image forming operation, in which the image forming unit 30 forms an image of the read document fed by the automatic document feeding unit 824 and read by the reading device body 822 on a sheet fed by the sheet feeding unit 10, will be described.

When an image forming start signal is transmitted by an input to the touch panel 702 of an operation panel unit 843 by the user, the document to be read placed on the automatic document feeding unit 824 by the user is automatically fed toward a document reading position and the reading device body 822 reads the image at the document reading position.

When the reading device body 822 reads the image of the document, the exposure device 32 irradiates a plurality of laser beams corresponding to the respective photosensitive drums 740Y to 740K toward the photosensitive drums 740Y to 740K based on image information of the read document. At this time, the photosensitive drums 740Y to 740K are respectively charged in advance by the chargers 741Y to 741K, and if the laser beams corresponding to the respective photosensitive drums 740Y to 740K are irradiated, the respective electrostatic latent images are formed on the photosensitive drums 740Y to 740K. After then, the electrostatic latent images respectively formed on the photosensitive drums 740Y to 740K are developed by the developing devices 742Y to 742K and toner images of yellow (Y), magenta (M), cyan (C), and black (K) are formed on the photosensitive drums 740Y to 740K. The toner images of the respective colors formed on the photosensitive drums 740Y to 740K are superimposed and transferred to the intermediate transfer belt 35 by the primary transfer rollers 36Y to 36K and the superimposed and transferred toner image (full-color toner image) is transported to the nip unit N while being carried on the intermediate transfer belt 35.

In parallel to the image forming operation described above, the sheet loaded on the sheet loading unit 11 is fed to a sheet transport path 26 by the pickup roller 15 while being separated one by one by the separate feeding unit 12. Then, the skew feeding is corrected by resistance roller pair 27 on an upstream side of the nip unit N in a sheet transport direction and is transported to the nip unit N at a prescribed transport timing. The full-color toner image carried by the intermediate transfer belt 35 is transferred by the secondary transfer roller 37 onto the sheet transported to the nip unit N.

The sheet on which the toner image is transferred is heated and pressed by the fixing unit 34 so that the toner image is melted and fixed, and the sheet is discharged outside the device by discharge roller pair 18. The sheet discharged outside the device is loaded on a discharged sheet loading unit 19.

In the case of forming the image on both sides (first surface and second surface) of the sheet, before the sheet on which the image is formed on the first surface is discharged outside the device, the discharge roller pair 18 are rotated in a reverse direction and the sheet is transported to a double-side transport path 17, and the sheet is transported again to the image forming unit 30 via the double-side transport path 17. Then, in the same manner as the first surface, the image is formed on the second surface and the sheet is discharged outside the device. The sheet discharged outside the device is loaded on a discharged sheet loading unit 19.

Next, a method for realizing the timing in each of the embodiments described above will be described.

Figure 17:
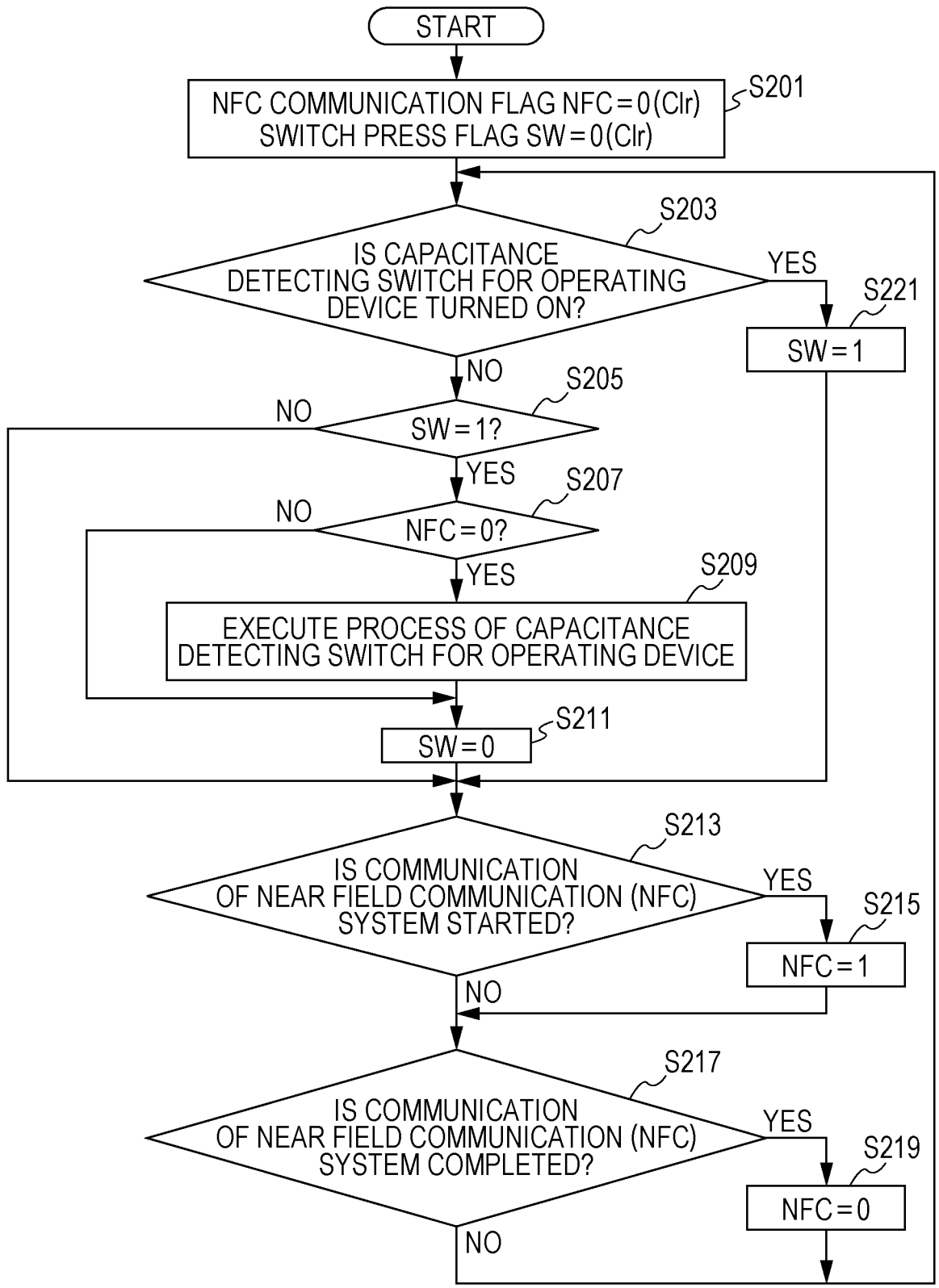
FIG. 17 is a flowchart for explaining an example of the operation switch press erroneous-detection avoidance method according to the first embodiment of the present disclosure.

FIG. 17 is a detailed example of a method according to the first embodiment.

With reference to FIG. 17, firstly, a communication flag NFC indicating whether or not the NFC is performed is reset to zero and a switch press flag SW indicating whether or not a capacitance detecting switch (hereinafter, referred to as "operation switch") for operating the device is pressed is also reset to zero (step S201).

Next, it is examined whether or not the operation switch is turned ON (step S203). If the operation switch is turned ON (NO in step S203), it is examined whether or not the switch press flag SW is 1 (step S205). If the switch press flag SW is 1 (YES in step S205), it is detected that the operation switch is pressed and released. In this case, it is examined whether or not the communication flag NFC is zero (step S207). If the communication flag NFC is zero, it is determined that the reason why the operation switch is pressed is not due to the device approaching the operation switch so as to perform the NFC but due to the user. The process corresponding to the operation switch being pressed is activated (step S209), the switch press flag SW is reset to zero (step S211), and the process proceeds to step S213.

If the switch press flag SW is 0 (NO in step S205), it is not detected that the operation switch is pressed and released and the switch press flag SW is already 0, so that steps S207, S209, and S211 are bypassed and the process proceeds to step S213.

In a case where the switch press flag SW is 1 (YES in step S205) and the communication flag NFC is 1 (NO in step S207), it means that the reason why the operation switch is pressed is due to the device approaching the operation switch so as to perform the NFC, so that step S209 is bypassed, the switch press flag SW is reset to zero (step S211), and the process proceeds to step S213.

Here, hardware or software which examines whether or not the NFC is executed, outputs an NFC start signal indicating the NFC start, and outputs an NFC completion signal indicating the NFC completion and a combination (NFC detection system) of the hardware and the software exist independently with hardware, software, and a combination of the hardware and the software which execute the processes illustrated in FIG. 17. For the processes illustrated in FIG. 17, an NFC detecting system is used.

If it is detected that the near field communication system starts the NFC by the NFC start signal (YES in step S213), the communication flag NFC is set to 1 so as to reflect the current state (step S215).

If it is detected that the near field communication system completes the NFC by the NFC completion signal (YES in step S217), the communication flag NFC is reset to zero so as to reflect the current state (step S219).

Here, as a description related to the period when the NFC is executed, if the NFC is started, the communication flag NFC is set to 1 in step S215 and the process proceeds to step S203. At this time, if the switch is not pressed by the device (NO in step S203), the process proceeds to step S205. If the switch press flag SW is zero, steps S207, S209, and S211 are bypassed and the process proceeds to step S203 again. If the switch is pressed by the device (YES in step S203), the switch press flag SW is set to 1 in step S221 and the process proceeds to step S213 again. If the processes described above are repeated several times and the press of the switch by the device is completed, it means that NO in step S203. Since SW=1, YES in step S205. However, since the NFC=1 until the NFC is completed, it is possible to avoid step S209 being executed. In step S211, the switch press flag SW is reset to zero. After then, the NFC is completed and the communication flag NFC is reset to zero in step S219. Therefore, even if the switch is pressed and released by the device for performing the NFC, while the NFC is executed, it is possible to avoid step S209 being executed.

Figure 18:
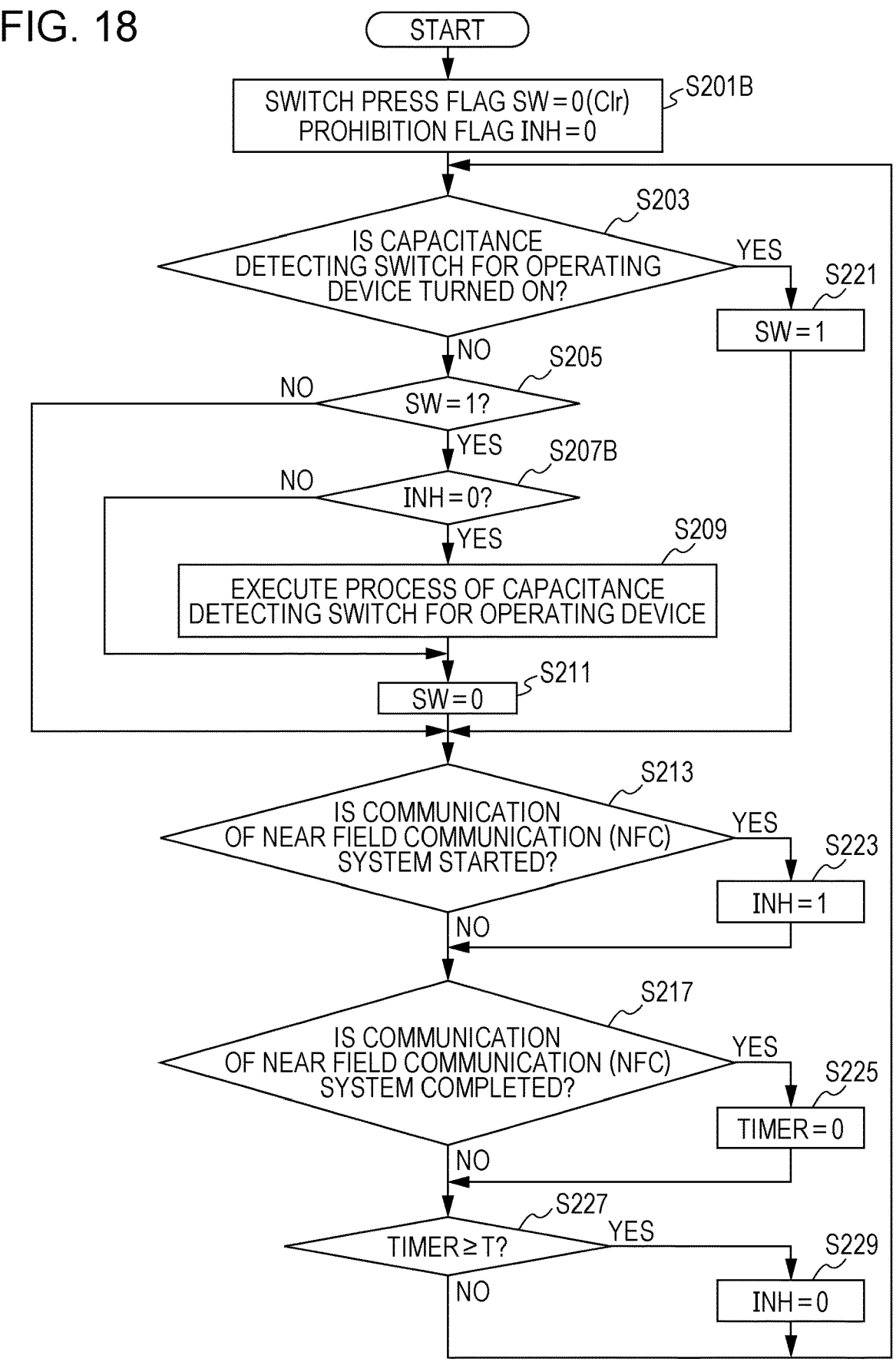
FIG. 18 is a flowchart for explaining an example of the operation switch press erroneous-detection avoidance method according to the second embodiment of the present disclosure.

FIG. 18 is a detailed example of a method according to the second embodiment.

With reference to FIG. 18, the switch press flag SW indicating whether or not a capacitance detecting switch (hereinafter, referred to as "operation switch") for operating the device is pressed is reset to zero and the prohibition flag INH for prohibiting the NFC is reset to zero (step S201B).

Next, it is examined whether or not the operation switch is turned ON (step S203). If the operation switch is turned ON (NO in step S203), it is examined whether or not the switch press flag SW is 1 (step S205). If the switch press flag SW is 1 (YES in step S205), it is detected that the operation switch is pressed and released. In this case, unlike the first embodiment, it is examined whether or not the prohibition flag INH is zero (step S207B). If the prohibition flag INH is zero, it is determined that the reason why the operation switch is pressed is not due to the device approaching the operation switch so as to perform the NFC but due to the user. The process corresponding to the operation switch being pressed is activated (step S209), the switch press flag SW is reset to zero (step S211), and the process proceeds to step S213.

If the switch press flag SW is 0 (NO in step S205), it is not detected that the operation switch is pressed and released and the switch press flag SW is already 0, so that steps S207B, S209, and S211 are bypassed and the process proceeds to step S213.

In a case where the switch press flag SW is 1 (YES in step S205) and the prohibition flag INH is 1 (NO in step S207B), it means that the reason why the operation switch is pressed is due to the device approaching the operation switch so as to perform the NFC, so that step S209 is bypassed, the switch press flag SW is reset to zero (step S211), and the process proceeds to step S213.

Here, hardware or software which examines whether or not the NFC is executed, outputs the NFC start signal indicating the NFC start, and outputs the NFC completion signal indicating the NFC completion and a combination (NFC detection system) of the hardware and the software exist independently with hardware, software, and a combination of the hardware and the software which execute the processes illustrated in FIG. 18. For the processes illustrated in FIG. 18, the NFC detecting system is used.

If it is detected that the near field communication system starts the NFC by the NFC start signal (YES in step S213), the prohibition flag INH is set to 1 (step S223).

If it is detected that the near field communication system completes the NFC by the NFC completion signal (YES in step S217), the timer TIMER is reset to zero and the timer starts counting (step S225).

Here, the timer operates out of a range of the program which performs the processes represented by the flowchart. In this method, it is any time possible to examine a value of the timer.

If the timer TIMER is equal to or larger than a period T (YES in step S227), the prohibition flag INH is reset to zero (step S229) and the timer TIMER is reset to zero and stops counting.

Next, the process is returned to step S203.

Here, as a description related to the period when the NFC is executed, if the NFC is started, the prohibition flag INH is set to 1 in step S223 and the switch press flag SW is reset to zero, then the process proceeds to step S203. In this case, if the switch is not pressed by the device (NO in step S203), the process proceeds to step S205. Since the switch press flag SW is zero, steps S207B, S209, and S211 are bypassed. Then, after going through three steps S213, S217 and S227, the process proceeds to step S203 again. If the switch is pressed by the device (YES in step S203), the switch press flag SW is set to 1 in step S221. Then, after going through three steps S213, S217 and S227, the process proceeds to step S203 again. If the processes described above are repeated several times and the press of the switch by the device is completed, it means that NO in step S203. Since SW=1, YES in step S205. However, since the INH=1 until the period T elapses after the NFC is completed, it is possible to avoid step S209 being executed. In step S211, the switch press flag SW is reset to zero. After then, if the prohibition flag INH is reset to zero in step S229 after the NFC is completed and the period T elapses, the process is completed. Therefore, even if the switch is pressed and released by the device for performing the NFC, during the period when the NFC is executed and the period T continued after the period when the NFC is executed, it is possible to avoid step S209 being executed.

Figure 19:
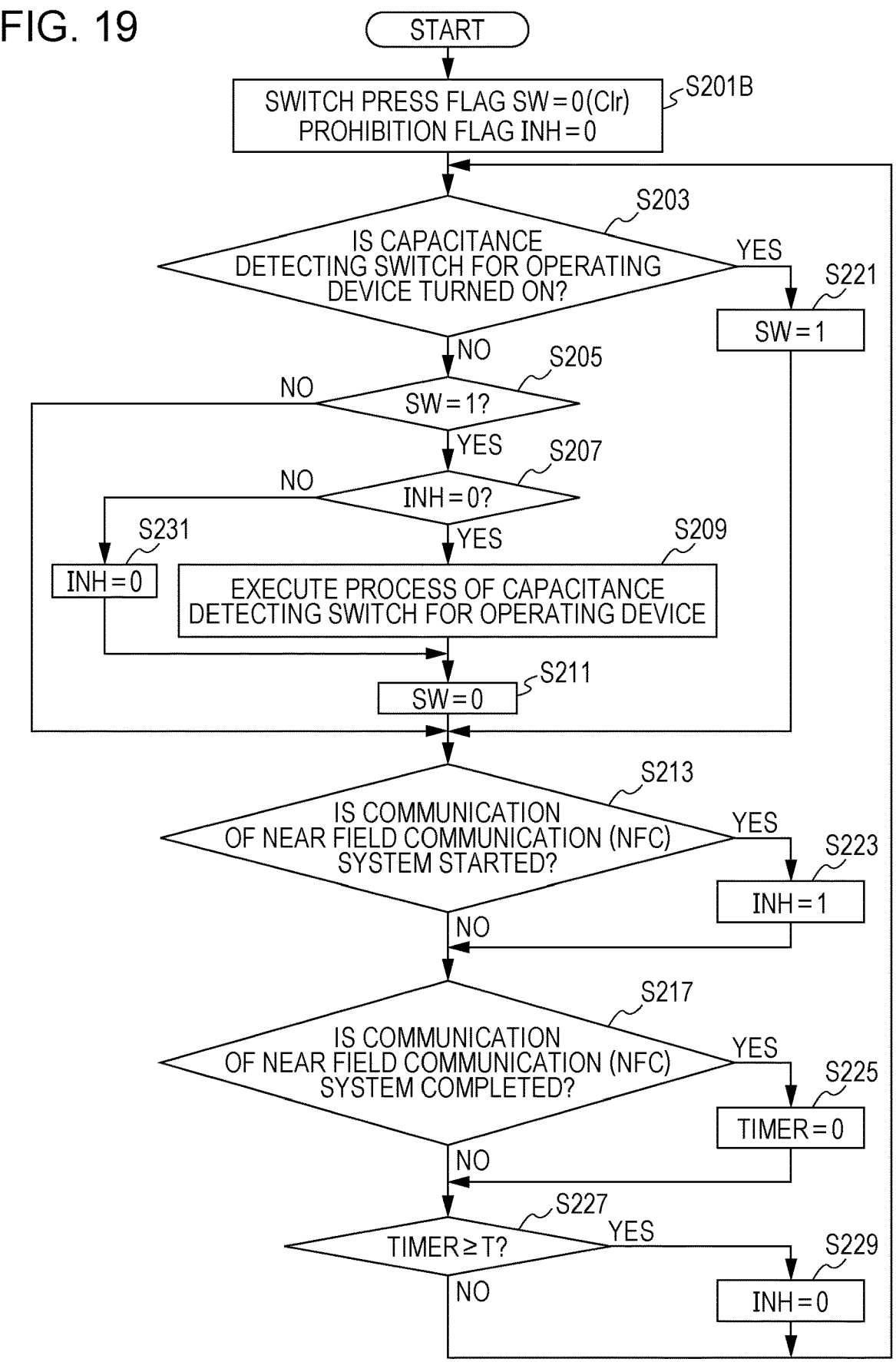
FIG. 19 is a flowchart for explaining an example of the operation switch press erroneous-detection avoidance method according to the third embodiment of the present disclosure.

FIG. 19 is a detailed example of a method according to the third embodiment.

With reference to FIG. 19, firstly, the switch press flag SW indicating whether or not a capacitance detecting switch (hereinafter, referred to as "operation switch") for operating the device is pressed is reset to zero and the prohibition flag INH for prohibiting the NFC is reset to zero (step S201B).

Next, it is examined whether or not the operation switch is turned ON (step S203). If the operation switch is turned ON (NO in step S203), it is examined whether or not the switch press flag SW is 1 (step S205). If the switch press flag SW is 1 (YES in step S205), it is detected that the operation switch is pressed and released. In this case, unlike the first embodiment, it is examined whether or not the prohibition flag INH is zero (step S207B). If the prohibition flag INH is zero, there is high probability that the reason why the operation switch is pressed is not due to the device approaching the operation switch so as to perform the NFC but due to the user. The process corresponding to the operation switch being pressed is activated (step S209), the switch press flag SW is reset to zero (step S211), and the process proceeds to step S213.

If the switch press flag SW is 0 (NO in step S205), it is not detected that the operation switch is pressed and released, so that steps S207, S209, and S211 are bypassed and the process proceeds to step S213.

In a case where the switch press flag SW is 1 (YES in step S205) and the prohibition flag INH is 1 (NO in step S207), it means that the reason why the operation switch is pressed is due to the device approaching the operation switch so as to perform the NFC, so that step S209 is bypassed and the prohibition flag INH is reset to zero in step S231, then the switch press flag SW is reset to zero (step S211) and the process proceeds to step S213.

Here, hardware or software which examines whether or not the NFC is executed, outputs the NFC start signal indicating the NFC start, and outputs the NFC completion signal indicating the NFC completion and a combination (NFC detection system) of the hardware and the software exist independently with hardware, software, and a combination of the hardware and the software which execute the processes illustrated in FIG. 19. For the processes illustrated in FIG. 19, the NFC detecting system is used.

If it is detected that the near field communication system starts the NFC by the NFC start signal (YES in step S213), the prohibition flag INH is set to 1 (step S223).

If it is detected that the near field communication system completes the NFC by the NFC completion signal (YES in step S217), the timer TIMER is reset to zero and the timer starts counting (step S225).

Here, the timer operates out of a range of the program which performs the processes represented by the flowchart. In this method, it is any time possible to examine a value of the timer.

If the timer TIMER is equal to or larger than a period T (YES in step S227), the prohibition flag INH is reset to zero (step S229) and the timer TIMER is reset to zero and stops counting.

Next, the process is returned to step S203.

Here, as a description related to the period when the NFC is executed, if the NFC is started, the prohibition flag INH is set to 1 in step S223 and the switch press flag SW is reset to zero, then the process proceeds to step S203. In this case, if the switch is not pressed by the device (NO in step S203), the process proceeds to step S205. Since the switch press flag SW is zero, steps S207, S209, and S211 are bypassed and the process proceeds to step S203 again. If the switch is pressed by the device (YES in step S203), the switch press flag SW is set to 1 in step S221 and the process proceeds to step S213 again. If the processes described above are repeated several times and the press of the switch by the device is completed, it means that NO in step S203. Since SW=1, YES in step S205. However, since the INH=1 until the period T elapses after the NFC is completed, it is possible to avoid step S209 being executed. In step S211, the switch press flag SW is reset to zero. After then, the prohibition flag INH is reset to zero in step S229 after the NFC is completed and the period T elapses. Therefore, even if the switch is pressed and released by the device for performing the NFC, during the period when the NFC is executed and the period T continued after the period when the NFC is executed, it is possible to avoid step S209 being executed. In addition, it becomes possible that step S209 is executed by the transition of the operation switch being pressed and released for the second time or more after the NFC is started.

FIGS. 20A and 20B are a detailed example of a method according to the first embodiment.

With reference to FIGS. 20A and 20B, firstly, the communication flag NFC indicating whether or not the NFC is executed is reset to zero, the switch press flag SW indicating whether or not the capacitance detecting switch (hereinafter, referred to as "operation switch") for operating the device is pressed is reset to zero, an invalidity flag non_SW for invalidating the operation switch is reset to zero, and a state flag STATE for controlling a flow is reset to zero (step S301). Here, invalidating the operation switch is to avoid the process related to the operation switch from being activated by the switch-up regarding the operation switch.

Next, it is examined whether or not a value of the state flag STATE is 1 (step S303).

If the state flag STATE is 1, the process proceeds to step S305. If the state flag STATE is 0, the process proceeds to step S321.

In step S305, it is examined whether or not the communication flag NFC is zero.

If the communication flag NFC is zero (YES in step S305) and the NFC system detects electromagnetism (YES in step S307), it means that the NFC which is paused so far is started, so that the communication flag NFC is set to 1 (step S309) and the process proceeds to step S341.

If the communication flag NFC is zero (YES in step S305) and the NFC system does not detect electromagnetism (NO in step S307), it means that the NFC continues to be paused, so that without setting the communication flag NFC to 1, the process proceeds to step S341.

If the communication flag NFC is 1 (NO in step S305) and the NFC system does not detect electromagnetism (YES in step S311), it means that the NFC which is executed so far is completed, so that the communication flag NFC is reset to zero (step S313) and the process proceeds to step S341.

If the communication flag NFC is 1 (NO in step S305) and the NFC system detects electromagnetism (NO in step S311), it means that the NFC continues to be executed, so that the communication flag NFC is not reset to zero, the process proceeds to step S341.

In step S321, it is examined whether or not the switch press flag SW is zero.

If the switch press flag SW is 1 (NO in step S321), it is examined whether or not the operation switch is turned OFF. If the operation switch is turned OFF (YES in step S327), it means that the switch-up occurs. Since there is a possibility that the process associated with the operation switch is desired to be activated, it is examined whether or not the invalidity flag non_SW is zero. If the invalidity flag non_SW is zero (YES in step S329), the process associated with the operation switch is activated (step S333).

If the switch press flag SW is 1 (NO in step S321), it is examined whether or not the operation switch is turned OFF. If the operation switch is turned OFF (YES in step S327), it means that the switch-up occurs. Since there is a possibility that the process associated with the operation switch is desired to be activated, it is examined whether or not the invalidity flag non_SW is zero. If the invalidity flag non_SW is not zero (NO in step S329), the activation of the process associated with the operation switch is avoided and the invalidity flag non_SW is reset to zero (step S331).

After step S333 or step S331, the switch press flag SW is reset to zero so as to reflect the state of the current operation switch (step S335) and the process proceeds to step S347.

If the switch press flag SW is 1 (NO in step S321), it is examined whether or not the operation switch is turned OFF and if the operation switch is not turned OFF (NO in step S327), the process proceeds to step S341.

If the switch press flag SW is zero (YES in step S321), it is examined whether or not the operation switch is turned ON. If the operation switch is turned ON (YES in step S323), the switch-down occurs, so that the switch press flag SW is set to 1 and the process proceeds to step S341.

If the switch press flag SW is zero (YES in step S321), it is examined whether or not the operation switch is turned ON. If the operation switch is not turned ON (NO in step S323), the operation switch is kept released, so that the switch press flag SW is kept at zero and the process proceeds to step S341.

In step S341, it is examined that the switch press flag SW is 1 and the communication flag NFC is 1 (step S341). If the switch press flag SW is 1 and the communication flag NFC is 1, it means that the operation switch is pressed by the mobile terminal such as a smartphone executing the NFC. In order to avoid the process associated with the operation switch from being activated, the invalidity flag non_SW is set to 1 (step S343) and the process proceeds to step S347. As described above, it is examined whether or not the invalidity flag non_SW is zero in step S329.

In step S341, it is examined that the switch press flag SW is 1 and the communication flag NFC is 1 (step S341). If the switch press flag SW is 1 and the communication flag NFC is 1, it means that the operation switch is pressed by the mobile terminal such as a smartphone executing the NFC, so that step S343 is bypassed and the process proceeds to step S347.

In step S347, the state flag STATE is increased by 1 and if the state flag STATE is larger than 1 after the increase, the state flag STATE is reset to zero and the process proceeds to step S303.

The switch operation erroneous-detection avoidance device described above can be realized by hardware, software, or a combination of the hardware and the software. In addition, an operation switch press erroneous-detection avoidance method performed by the switch operation erroneous-detection avoidance device described above can be also realized by hardware, software, or a combination of the hardware and the software. Here, being realized by software means that a computer reads a program and executes the program.

The program may be stored by using various types of a non-transitory computer readable medium and may be supplied to the computer. The non-transitory computer readable medium includes various types of a tangible storage medium. An example of the non-transitory computer readable medium includes a magnetic recording medium (for example, flexible disk, magnetic tape, and hard disk drive), a magneto-optical recording medium (for example, magneto-optical disk), a CD-read only memory (ROM), a CD-R, a CD-R/W, and a semiconductor memory (for example, mask ROM, programmable ROM (PROM), erasable PROM (EPROM), flash ROM, and random access memory (RAM)). In addition, the program may be supplied to the computer by using various types of a non-transitory computer readable medium. An example of the non-transitory computer readable medium includes an electrical signal, an optical signal, and an electromagnetic wave. The non-transitory computer readable medium can supply the program to the computer via a wired communication line such as a wire and an optical fiber or a wireless communication line.

Further, in the above description, the case where the mobile terminal approaches the NFC antenna is described as an example for the NFC reader/writer and the mobile terminal to execute the NFC, but the case where the NFC reader/writer and the NFC are performed is limited to the mobile terminal. For example, the mobile terminal may be replaced with a portable object such as a card (IC card or the like) capable of performing NFC.

In addition, the present disclosure can also be applied to a configuration without a combination of the NFC reader/writer and the portable object (for example, mobile terminal, card, or the like) which is the device communicating with the NFC reader/writer. For example, the present disclosure may be applied to the configuration in which an object for performing some functions on the operation switch or a switch provided close to the operation switch approaches the operation switch and apparently presses the operation switch.

In particular, instead of having the function of the NFC, the object may have a performance of detecting the object which approaches the switch provided close to the operation switch. For example, as long as the object is an object which includes a detecting target which can be detected by using a sensor (for example, barcode reader, optical sensor, magnetic sensor, electric field sensor, camera, pressure sensor, or the like) provided close to the operation switch and it is possible to recognize that the user accidentally presses the operation switch by the object in the case where the operation switch is apparently pressed, the configuration may be included in the present disclosure.

The present disclosure may be used for avoiding operation switch press erroneous-detection.

The present disclosure contains subject matter related to that disclosed in Japanese Priority Patent Application JP 2017-200363 filed in the Japan Patent Office on Oct. 16, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A switch operation erroneous-detection avoidance device comprising:
   an execution control unit that if an operation switch press erroneous-detection avoidance device communicates with a portable object when an operation switch transits from a pressed state to an unpressed state, prohibits execution of a process associated with the operation switch and if the operation switch press erroneous detection avoidance device does not communicate with the portable object when the operation switch transits from the pressed state to the unpressed state, permits the execution of the process associated with the operation switch.

2. The switch operation erroneous-detection avoidance device according to claim 1, wherein if the operation switch transits from the pressed state to the unpressed state before a prescribed period elapses after the execution of communication with the portable object is completed, the execution control unit prohibits the execution of the process associated with the operation switch.

3. The switch operation erroneous-detection avoidance device according to claim 2, wherein when the operation switch transits from the pressed state to the unpressed state, the execution control unit completes the prescribed period.

4. The switch operation erroneous-detection avoidance device according to claim 1, wherein the portable object is a communication device.

5. The switch operation erroneous-detection avoidance device according to claim 2, wherein the portable object is a communication device.

6. A multifunctional machine comprising the switch operation erroneous-detection avoidance device according to claim 1.

7. A switch operation erroneous-detection avoidance method comprising:

determining whether or not an operation switch press erroneous-detection avoidance device communicates with a portable object when an operation switch transits from a pressed state to an unpressed state, and prohibiting execution of a process associated with the operation switch in a case where it is determined that the communication with the portable object is executed in the determining and permitting the execution of the process associated with the operation switch in a case where it is determined that the communication with the portable object is not executed in the determining.

\* \* \* \* \*